United States Patent [19]
Gray et al.

[11] Patent Number: 4,845,628
[45] Date of Patent: * Jul. 4, 1989

[54] METHOD FOR OPTIMIZATION OF DRILLING COSTS

[75] Inventors: Richard L. Gray, Austin, Tex.; Vivien J. Cambridge, Baton Rouge, La.

[73] Assignee: Automated Decisions, Inc., Austin, Tex.

[*] Notice: The portion of the term of this patent subsequent to Dec. 27, 2005 has been disclaimed.

[21] Appl. No.: 897,769

[22] Filed: Aug. 18, 1986

[51] Int. Cl.⁴ .......................................... G06F 15/20
[52] U.S. Cl. ..................................... 364/420; 73/151; 73/151.5
[58] Field of Search ................. 364/420; 73/150, 151, 73/151.5; 175/39, 40, 45

[56] References Cited

U.S. PATENT DOCUMENTS

| | | |
|---|---|---|
| 3,660,649 | 5/1972 | Gilchrist et al. ............ 235/193 |
| 3,761,701 | 9/1973 | Wilder et al. ................ 73/151.5 |
| 4,165,789 | 8/1979 | Rogers ............................ 175/27 |
| 4,195,699 | 4/1980 | Rogese et al. .............. 73/151.5 |
| 4,340,934 | 7/1982 | Segesman ................... 364/422 |
| 4,354,233 | 10/1982 | Zhukovsky et al. ......... 364/420 |
| 4,368,509 | 1/1983 | Li ................................... 364/148 |
| 4,382,381 | 5/1983 | Soeiinah ........................ 73/151 |
| 4,407,017 | 9/1983 | Zhilikov et al. .............. 364/420 |
| 4,472,770 | 9/1984 | Li ................................... 364/148 |
| 4,479,176 | 10/1984 | Grimshaw ..................... 364/148 |
| 4,627,276 | 12/1986 | Burgess .......................... 73/151 |
| 4,639,868 | 1/1987 | Tanaka et al. ............... 364/420 |

Primary Examiner—Jerry Smith
Assistant Examiner—Kimthanh Tbui
Attorney, Agent, or Firm—Richards, Harris, Medlock & Andrews

[57] ABSTRACT

Disclosed is a real-time method for minimizing the expected, controllable unit cost over a future drilling interval by simulating the values of selected operating variables and lithologies.

28 Claims, 4 Drawing Sheets

PREDICTIVE PENETRATION
RATE MODEL

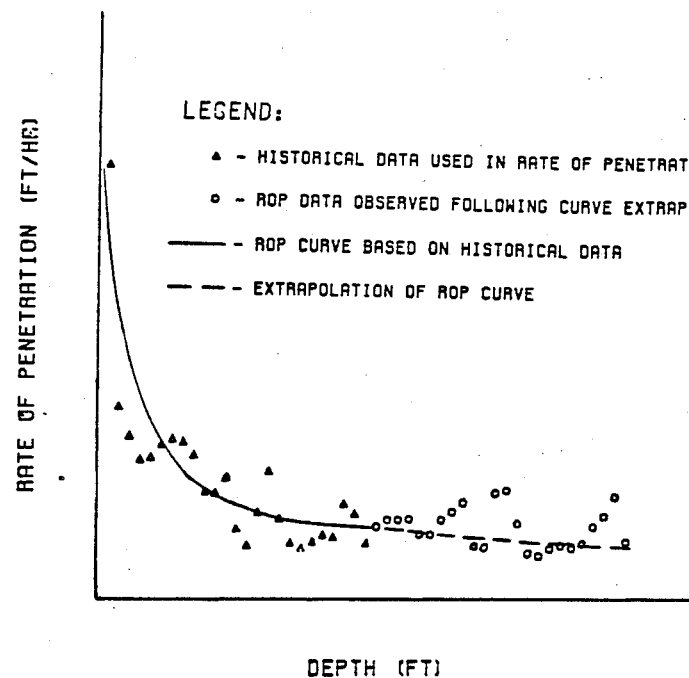
FIGURE 1. PREDICTIVE PENETRATION RATE MODEL
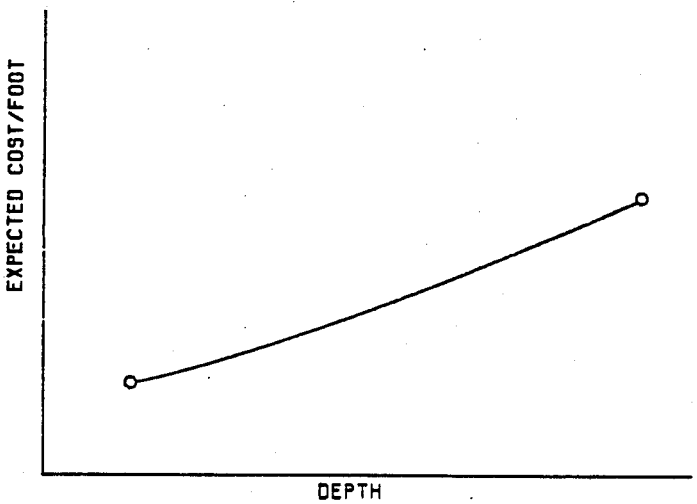
FIGURE 3. COST PER FOOT EXPECTED FOR THE REMAINDER OF THE BIT LIFE

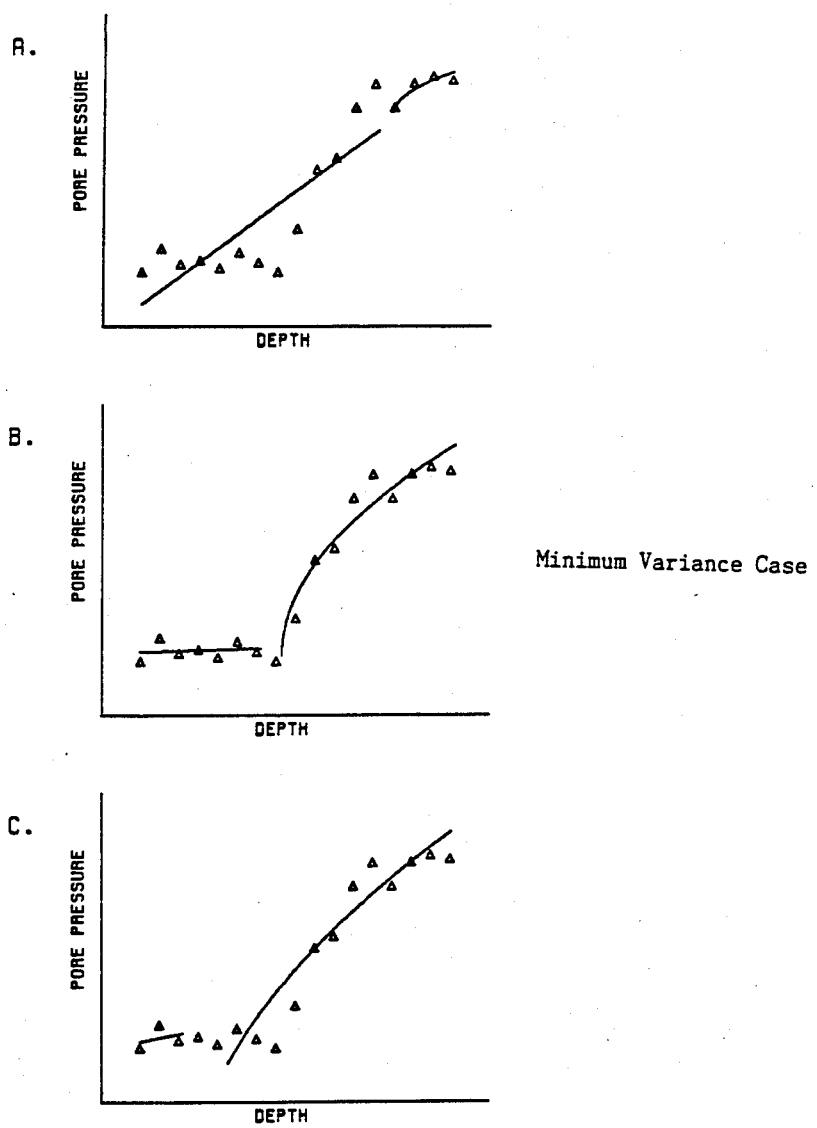
Minimum Variance Case
FIGURE 2. IDENTIFICATION OF
ABNORMALLY PRESSURED
FORMATIONS

ISO-COST-PER-FOOT CURVES

METHOD FOR OPTIMIZATION OF DRILLING COSTS

TECHNICAL FIELD

This invention relates to drilling operations, and more particularly to a method for minimizing total expected, controllable costs during drilling operations.

BACKGROUND ART

A. Field of the Invention

The method described in this invention is an integrated approach to minimizing expected, controllable unit costs during drilling operations by optimizing real-time values of operating variables. The term "expected, controllable unit costs" refers to costs that will likely be incurred during drilling over a future interval of a well and which can be affected by decisions made by drilling personnel.

The invention is based on circumstances generally encountered during drilling operations for hydrocarbons. However, the techniques may be applied to other mining, drilling, or similar capital intensive industrial operations in which real-time optimization of operating variables can result in cost reductions.

The total cost of drilling a well is a function of the time required for actual drilling operations in addition to the time allocated to non-drilling activities such as, for example, well logging and setting casing. In order to minimize total drilling costs, it is necessary to minimize the time required for actual drilling operations. The speed at which drilling operations proceed is commonly measured by the penetration rate of the bit. If the penetration rate can be optimized over a future drilling interval, it is likely that drilling-related costs can also be optimized over the same interval.

During drilling operations, the values of certain drilling variables are usually chosen by operating personnel who rely primarily on experience and historical data. In some cases the values they select are close to the optimal ones; however, the absence of a real-time, predictive, quantifiable methodology usually results in selections which only coincidentially represent the optimal values.

The purpose of the optimization method described in this invention is to identify values of selected operating variables that will minimize expected, controllable unit costs over a future drilling interval. In the normal operating mode, this optimization involves a simulation of weight on bit and rotary speed since these two variables are generally considered the most important "controllable" variables. Other variables, however, can also be simulated. In addition, zones of different lithologies represented by different sets of drilling data can be simulated to examine the effects on the expected, controllable unit costs.

A successful optimization of expected, controllable unit costs depends on a valid simulation of operating variables which, in turn, is a function of an accurate predictive penetration rate model. The penetration rate model given in this invention is a multivariate model that consists of drilling variables that are known to have a significant effect on the penetration rate of a bit under real-time conditions (see FIG. 1).

The method described in this invention utilizes a predictive variance statistic which quantifies data quality and insures that the penetration rate model is based on the best available predictor variables. With this statistic, variables that may be quantified through technological advances may be evaluated for inclusion in the penetration rate model.

The invention also describes an expression for calculating expected, controllable unit costs whereby both bit costs and rig operating costs are prorated over a future drilling interval.

B. Description of the Prior Art

The importance of establishing the correct values for controllable drilling variables has been recognized for some time, and optimization attempts have been made in the past. However, these efforts have not been successful for several reasons including the following: (1) they were based on incomplete or inaccurate penetration rate models, or (2) they were static, i.e., they used constants that were not always applicable to the given well, or (3) time constraints did not permit all the required calculations to be performed before drilling conditions changed, and (4) bit costs and tripping costs were incorrectly prorated. Given these and other shortcomings, real-time optimization models have not gained acceptance in field applications.

Several authors have studied the effects on the penetration rate of individual drilling variables including weight on bit, rotary speed, bit hydraulics, and drilling fluid properties. In virtually all these studies, the effect of an individual variable on the penetration rate was examined while holding all other variables constant. While informative, the conclusions derived from these studies could not be directly applied in the field since drilling variables are dynamic under real-time conditions. An example of a single variable study is one that was conducted by Eckel who correlated the penetration rate with a Reynolds number function based on bit hydraulics.

Only in the last two decdes have efforts been made to develop a comprehensive model of the penetration rate pattern. M. G. Bingham developed one of the first such models, but it only included formation properties, weight on bit, and rotary speed. Not only were other important drilling variables omitted, but no attempt was made to insure that the model was applicable under a variety of drilling conditions or in different formations. Other authors have proposed methods that may be operable if real-time data on the type of lithology encountered are available.

U.S. Pat. No. 4,407,017 of Zhilikov, Motsokhein, and Parfenov describes an automatic method for controlling drilling variables based on an adaptive mathematical model that considers only the penetration rate, weight on bit, and rotary speed. This method is based on separating the drilling operation into a trial mode and a drilling mode proper. During the trial mode, coefficients of weight on bit and rotary speed are calculated and if they are constant during a six-spot trial, are used to generate adaptive signals that automatically adjust the weight on bit and rotary speed during the drilling mode. This method does not incorporate important drilling variables and mechanisms other than weight on bit and rotary speed nor does it recognize that changes in lithology may impact the weight on bit and rotary speed coefficients if they are calculated by the method described in the invention.

The translation of drilling engineering models into effective, real-time decision models based on expected, controllable costs has not been conducted properly in previous studies. Other authors have proposed models based on historical costs incurred during prior drilling intervals, as opposed to models based on expected costs likely to occur over future drilling intervals.

In addition, other authors have not differentiated between total costs and controllable costs. Total costs include all drilling-related costs such as drill pipe, casing, mud, logging services, site preparation, etc. These costs are significant, but due to their quasi-fixed nature, cannot be appreciably changed in the short run. Even when otpimization of these costs is feasible, it is not easily performed on a real-time basis.

In contrast to the quasi-fixed aspect of total costs, controllable costs can be altered in the short run. As used in the present method, controllable costs are future costs that can be optimized in real-time.

DISCLOSURE OF THE INVENTION

The method of the present invention consists of a real-time, predictve penetration rate model that incorporates significant drilling variables. A predictive variance statistic is used to quantify data quality as well as the predictive ability of drilling variables and prospective penetration rate models.

Another technique, transition point analysis, derermines model parameters representing the sensitivity of the penetration rate of a bit to selected drilling variables even when data are acquired from different lithologies. A regression analysis is used to assign parameters to the remaining variables. Taken together, these techniques result in a real-time, predictive penetration rate expression that is unique to each bit run of ech hole drilled.

In accordance with another aspect of the present method, a method is provided which extrapolates the penetration rate expression over a future drilling interval and estimates the depth and time required to drill to a specified degree of bit wear. The calculated values of depth and time are inputs to an expected controllable unit cost expression which also incorporates bit costs that will be incurred in order to drill the future interval.

The present method further simulates different values of selected operating variables and calculates the resulting effects on the expected, controllable unit cost.

The present method considers predetermined casing setting and logging depths, varying bit costs and rig rates and contains provisions for handling phenomena such as abnormally pressured formations.

In optional modes, combinations of drilling variables, parameters, and intervals comprising different lithologies can be simulated, and the effect on the expected, controllable unit costs can be examined.

BRIEF DESCRIPTION OF THE DRAWINGS

For a more complete understanding of the present invention and for further advantages thereof, reference is now made to the following Detailed Description taken in conjunction with the accompanying Drawings in which:

FIG 1 is a graph of rate of penetration versus depth for a predictive penetration rate model;

FIGS. 2A, 2B and 2C are graphs of pore pressure versus depth for the identification of abnormally pressured formations;

FIG. 3 is a graph of the expected cost per foot versus depth for the remainder of bit life;

DETAILED DESCRIPTION

A. Predictive Penetration Rate Model

Figure 4:
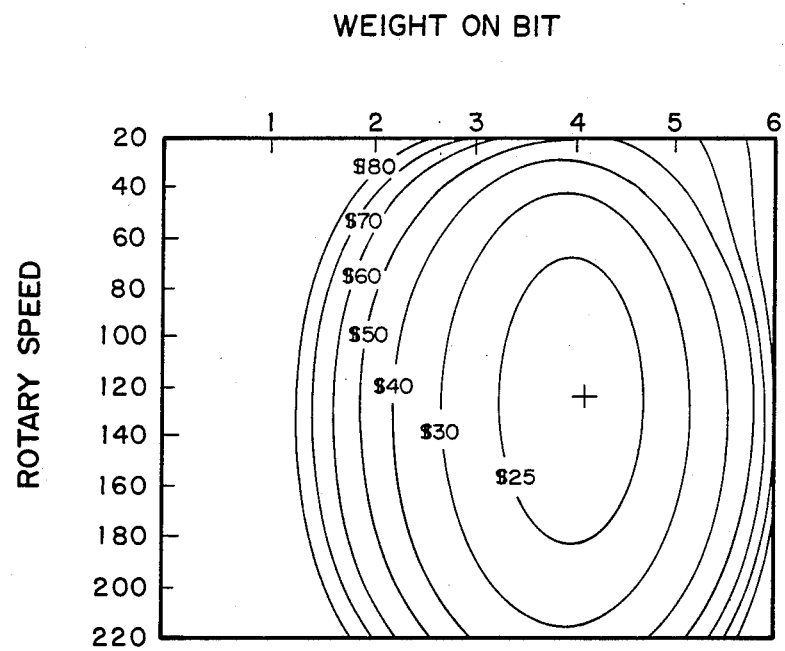
FIG. 4 is a graph of the expected cost per foot curves as a function of simulated values of rotary speed and weight on bit.

The present invention utilizes a real-time multivariate, preducive penetration rate model, an example of which is set forth in Equation 1. When multiple penetration rate models are available, the present method identifies the best predictive model through the use of a predictive variance statistic.

Equation 1 represents a predictive penetration rate model that is comprised of important drilling variables and drilling mechanisms that are known to affect the penetration rate of a bit. These variables and mechanisms can be directly measured or represented through empirical relationships. The model also contains provisions that make it dynamic, i.e., it is unique to both the operating conditions and lithology of each bit run on which it is used.

$$dD/dt = K*(W/\pi d^2)^{a_1}*(N/60)^{a_2}*(BH)^{a_3}*\exp(-a_4w + a_5(g_p) + a_6(g_p - \rho_E) + a_7(10000 - D)) \quad (1)$$

where:

$dD/dt$ = penetration rate of the bit
K = general coefficient that captures effects of lithology, drilling phenomena and variables not explicitly quantified
W = weight on bit
d = bit diameter
N = rotary speed
BH = bit hydraulics
exp = exponential function [exp (x) = $e^x$]
w = fractional bit wear
$g_p$ = pore pressure
$\rho_E$ = equivalent circulating density
D = depth
$a_1$ to $a_7$ = parameters calculated for each variable; W, N, BH, w, $g_{pL}$, $\rho_E$ and D, respectively.

In addition to the variables in Equation 1 that are explicitly considered by the present method, the penetration rate model also takes into account mud properties and other drilling variables that affect the equivalent circulating density, $\rho_E$.

Directly measured mud properties include the following:

$\rho_s$ = density of the cuttings
$\rho_m$ = density of the mud
$D_s$ = diameter of the cuttings
Mud rotational viscometer readings
Calculated mud properties include the following:
Bingham fluids
$\mu_a$ = apparent viscosity of drilling fluid
$\tau_y$ = yield point of drilling fluid
Power-Law fluids
K = consistency index
n = flow behavior index
The following variables are calculated for both Bingham and Power-Law fluids:
$\bar{v}$ = average flow velocity of drilling fluid in the annulus
T = transport ratio of cuttings in drilling fluid
$v_s$ = particle slip velocity in drilling fluid
SF = solids fraction in annulus
$P_c$ = casing pressure
$P_{da}$ = frictional pressure loss in annulus
$\rho_{f)a}$ = averge fluid density in annulus (mud and cuttings)

The present method considers mud systems based on either Bingham or Power-Law type fluids, and the fluid relationships used are as follows:

Calculation of Frictional Pressure Loss and Average Fluid Density

Frictional Pressure Loss, $P_{fa}$:

The frictional pressure loss in the annulus is calculted by examining the fluid type and determining if it conforms to laminar or turbulent flow.

For the assumed fluid, the unit frictional pressure loss, $dP_f/dL$, is calculated for both the laminar and turbulent cases, and the larger value is assumed to represent the better approximation to actual flow conditions. Unit frictional pressure loss expressions for each type of fluid are given as follows:

Bingham Plastic Fluid

Laminar flow:
$$\frac{dP_f}{dL} = \frac{\mu_p \ast v}{1000(d_2 - d_1)^2} + \frac{\tau_y}{200(d_2 - d_1)} \quad (2)$$

Turbulent Flow:
$$\frac{dP_f}{dL} = \frac{\rho^{.75} v^{1.75} \mu^{.25}}{1396(d_2 - d_1)^{1.25}} \quad (3)$$

Newtonian Fluid

Laminar flow:
$$\frac{dP_f}{dL} = \frac{\mu_p \ast v}{1000(d_2 - d_1)^2} \quad (4)$$

Turbulent Flow:
$$\frac{dP_f}{dL} = \frac{\rho^{.75} v^{1.75} \mu^{.25}}{1396(d_2 - d_1)^{1.25}} \quad (5)$$

Power-Law Fluid

Laminar Flow:
$$\frac{dP_f}{dL} = \frac{K v^n [(2 + 1/n)/0.0208]^n}{144000(d_2 - d_1)^{1+n}} \quad (6)$$

Turbulent flow:
$$\frac{dP_f}{dL} = \frac{f \rho v^2}{21.1(d_2 - d_1)} \quad (7)$$

where: f = Fanning friction factor

Total frictional pressure losses in the annulus, $P_{fa}$, are calculafted as follows:

$$P_{fa} = \sum_{i=1}^{n} (dP_f/dL)_i \ast L_i \quad (8)$$

where:
$(dP_f/dL)_i$ = unit annulus frictional pressure loss in section i
$L_i$ = length of drillstring section i
n = number of annulus sections Average Fluid Density, $\rho_{fa}$:

Following are the steps in the calculation of the average fluid density for each drillstring section:

Mud apparent viscosity, $\mu_a$:

$$\mu_a = K/144 \, [(D_o - D_i) \bar{v}]^{1-n} \ast [(2 + 1/n)/0.028]^n \quad (9)$$

Slip velocity, $v_s$:

The slip velocity of the cuttings traveling through the annulus is as follows:

$$v_{s)laminar} = 82.87 \, D_s (\rho_s \rho_f)/\mu_a \quad (10)$$

$$v_{s)intermediate} = [2.9 \, D_s (\rho_s - \rho_f)^{0.667}]/(\rho_f^{.333} \ast \mu_a^{.333}) \quad (11)$$

$$v_{s)turbulent} = 1.45 \, D_s^{.5} \ast [(\rho_s - \rho_f)/\rho_f]^{.5} \quad (12)$$

The lowest value of $v_s$ should be chosen as the actual slip velocity

Average velocity, $\bar{v}$:

The average velocity in the annulus is calculated as follows:

$$\bar{v} = q_m/[2.448(d_2^2 - d_1^2)] \quad (13)$$

where:
$q_m$ = volumetric pump flow rate
$d_1$ = outside pipe diameter
$d_2$ = inside casing diameter Transport ratio, T:

$$T = 1 - v_s/\bar{v} \quad (14)$$

Solids fraction, SF:

$$SF = q_s/(q_s + T \ast q_m) \quad (15)$$

where:
$q_s$ = volumetric flow rate of cuttings

Average fluid density, $\rho_{fa}$:

$$\rho_{fa} = \rho_m(1 - SF) + \rho_s(SF) \quad (16)$$

The average fluid density over the entire drillstring section is the weighted average of fluid densities in each section as follows:

$$\rho_{fa} = \frac{\sum_{i=1}^{n} (\rho_{fa})_i \ast L_i}{L \ast n} \quad (17)$$

where:
$(\rho_{fa})_i$ = fluid density in section i
L = total drillstring length

B. Predictive Variance Analysis

A principal objective of the present invention involves translating real-time penetration rate data into a real-time, predictive penetration rate expression. In order to accomplish this, the present invention utilizes a predictive variance statistic that measures the predicted residual error hereinafter referred to by its acronym, "PRE". PRE is used for the following purposes: (1) evaluation of data quality, (2) evaluation of variables comprising the penetration rate model (s), (3) differentiation between variables representing similar drilling mechanisms, (4) evaluaton of the predictive ability of penetration rate model(s), and (5) evaluation of prospective penetration rate models in addition to the one given in Equation 1 of this invention.

PRE compares predicted penetration rate values with actual penetration rate data and computes the resulting variance. The predicted values are determined on the basis of prior data, i.e., a given point is not used in the prediction of itself nor are data from depths greater than the point in question used for prediction purposes. PRE quantifies the predictive ability of the penetration rate model as follows:

$$PRE = \frac{\left[\sum_{i=m}^{n}(y_i - y_i)^2\right]^{\frac{1}{2}}}{n - m} \quad (18)$$

where:
PRE = predicted residual error
$Y_i$ = actual penetration rate value at point i
$_i$ = predicted penetration rate value at point i based on data from some interval prior to i
n = total number of data points
m = minimum number of data points to estimate $_i$ The present invention uses PRE for multiple purposes which are discussed separately as follows:

Evaluation of Data Quality

The PRE score functions as an index representing the quality of the data acquired, and hence, the confidence level that can be associated with the predictor expression. If the data are dispersed too widely, the resulting variance will be large and a predictive expression based on the data may not be reliable. Consequently, a threshold PRE value is established and the actual PRE scores are compared to this limit prior to displaying the results of the method calculations and/or recommending values of the controllable variables.

Evaluation of Variables

PRE routinely evaluates each variable in the penetration rate model(s) for its contribution to the reduction in the predicted residual error. This procedure, which is a step-wise algorithm, can be performed for any number of sequence of variables.

Variable Contribution to Penetration Rate
Model = $X_{m+1} - X_m$ (19)

An example is as follows:

| Variables Included in Penetration Rate Model | PRE Score | Contribution of Most Recently Added Variable |
|---|---|---|
| W | $x_1$ | |
| W,N | $x_2$ | $x_2 - x_1$ |
| W,N,BH | $x_3$ | $x_3 - x_2$ |
| W,N,BH,w | $x_4$ | $x_4 - x_3$ |
| W,N,BH,w,$g_p$ | $x_5$ | $x_5 - x_4$ |
| W,N,BH,w,$g_p$,($g_p - \rho_E$) | $x_6$ | $x_6 - x_5$ |
| W,N,BH,w,$g_p$,($g_p - \rho_E$),D | $x_7$ | $x_7 - x_6$ |

The preceding sequence of evaluation can be altered in optional modes.

While all the variables in Equation 1 are normally significant in explaining the mechanisms of the penetration rate, the present method does not automatically assume that the predictive ability of either Equation 1 or other prospective penetration rate models is enhanced by including all the variables. PRE insures that the inclusion of each variable in the predictive expression is continually justified.

Future instrumentation advances may result in quantifying new variables such as bit wear, bearing wear, formation pore pressure, or other drilling effects that are not presently available through real-time measurements. These new variables should be evaluated with PRE and incorporated in the present method if their inclusion improves the predictive ability of the penetration rate model.

Instrumentation advances may also permit variables to be directly measured downhole as opposed to measured at the surface or represented by empirical relationships. These "new" variables should be evaluated through PRE for possible inclusion in the penetration rate model or as substitutes for variables already in the model.

Differentiation Between Variables Representing Similar Drilling Mechanisms

PRE can be used to distinguish between variables that represent similar drilling mechanisms. For example, PRE determines whether bit horsepower or jet impact force is the better predictor variable representing the hole-cleaning effect. The variable that yields a lower PRE score is used in subsequent extrapolations of the penetration rate.

Evaluation of Predictive Ability of Penetration Rate Model

PRE routinely evaluates the predictive ability of the real-time penetration rate model given in Equation 1. If the PRE score exceeds established limits, the method temporarily suspends displays of the expected controllable unit cost. When the PRE score falls within the defined limits, the expected controllable unit cost display is resumed.

Evaluation of Prospective Penetration Rate Models

PRE can be used to evaluate penetration rate models other than the one given in Equation 1. Models with different variables or different mathematical expressions can be evaluated for their predictive ability on the basis of their PRE scores over some defined interval of analysis. The present method identifies and applies the predictive penetration rate model with the best PRE score.

C. Description of Variables in Penetration Rate Model

The present method utilizes the penetration rate model that is the best predictor expression for the penetration rate pattern. The variables that comprise Equation 1 were chosen because they represent drilling phenomena that are known to significantly affect the penetration rate of a bit.

Formation Drillability

Formation properties such as rock hardness are captured in K, the formation drillability factor. K is computed following calculation of the parameters $a_1$ to $a_7$ from a prior bit run and, consequently, represents a weighted average of the formation effects encountered during the prior bit run.

$$K = \sum_{i=1}^{n} [(dD/dt)_i/(W/\pi d^2)_i a_1 * (N/60)_i a_2 * (BH)_i a_3 * \exp(-a_4 w_i + \\ + a_5(g_p)_i + a_6(g_p - \rho_E)_i + a_7(10000 - D)_i)] \quad (20)$$

where:

n = number of data points

K may also represent the effects of other factors that are not explicitly measured such as the extent of sticking of the drillstring to the wellbore or the type of bottom-hole assembly used.

As an alternative to Equation 20, K may be calculated with a regression procedure.

Weight on Bit

The weight on the drill bit is routinely measured on most rigs. Since pressure exerted by the bit on the formation has a greater effect on the penetration rate than gross weight, the "weight on bit" is divided by the area of the bit currently being used.

Rotary Speed

The rotary speed of the drillstring is a routinely measured variable and both by convention and for statistical purposes is divided by 60 rpm in the present method.

Bit Hydraulics

Bit hydraulics can be represented by either bit horsepower or jet impact force. As previously described, the present method uses the predictive variance statistic, PRE, to determine whether bit horsepower or jet impact force better describes the penetration rate. The form of each bit hydraulics variable is as follows:

Horsepower Expended Across the Bit:

$$P_{BHP} = (\Delta P_{bit} * q_m)/1714$$

where:

$$\Delta P_{bit} = P_p - P_s - P_{fd} + H_d - H_a - P_{fa} - P_c \quad (21)$$

$P_p$ = pump pressure
$P_s$ = surface equipment pressure losses
$P_{fd}$ = frictional pressure losses in the drill pipe
$H_d$ = hydrostatic pressure in the drill pipe
$H_a$ = hydrostatic pressure in the annulus
$P_{fa}$ = frictional pressure losses in the annulus
$P_c$ = casing head pressure
$q_m$ = volumetric pump flow rate Jet Impact Force Expended Beneath the Bit:

$$F_j = 0.01823 * C_d * q_m * (\rho_m * \Delta P_{bit})^{\frac{1}{2}} \quad (22)$$

where:

0.01823 = constant based on field engineering units
$C_d$ = discharge coefficient
$\rho_m$ = mud density
$\Delta P_{bit} = P_p - P_s - P_{fd} + H_d - H_a - P_{fa} - P_c$

Bit Wear

Bit wear, w, is explicitly considered in Equation 1; however, there presently is no method for obtaining real-time measurements of the extent of bit wear while the bit is in the hole. Consequently, the present method estimates bit wear based on the formation abrasiveness of a prior bit run.

The present method requires an estimate of the final extent of bit wear to be input at the end of each bit run in order to quantify the formation abrasiveness. Operating personnel can grade the bit on a percentage worn basis, i.e., the bit may be judged to be 1 to 100% worn. Alternatively, the bit may be graded in fractional increments with 0 representing zero bit wear and 1.0 representing complete bit wear.

Formation Pore Pressure

The formation pore pressure gradient, $g_p$, is directly related to the degree of compaction or undercompaction of the rock matrix. During drilling, the formation pore pressure gradient affects the degree of underbalance or overbalance which is the difference between the formation pore pressure, $g_p$, and the equivalent circulating density of the wellbore fluid, $\rho_E$. A higher pore pressure increases the rate at which cuttings are removed from the region immediately under the bit.

Direct Measurement of Pore Pressure

A direct measurement of $g_p$ is the best source of an accurate pore pressure value and, if available through downhole equipment such as Measurement While Drilling systems or similar instrumentation, should be evaluated with PRE.

Identification of Abnormally Pressured Formations using Direct Pore Pressure Measurement If a direct downhole measurement of pore pressure is available, abnormally pressured formations representing deviations from a constant gradient level can be determined. The prediction score, PRE, is continuously evaluated over a fixed interval, and, in a normally pressured formation, can be expected to fall within defined statistical limits. The present method identifies abnormally pressured formations when the PRE score exceeds these limits.

The method will incorporate the new values of pore pressure in the penetration rate model and adjust the output accordingly. A graph of pore pressure versus depth is also available to operating personnel.

Pore Pressure Determination in the Absence of Direct Measurement

In the absence of a true pore pressure measurement, the present method assumes a constant pore pressure gradient. Instead of determining a specific value of $g_p$, the method assumes that the term, $a_5$ times $g_p$, is a constant which can be captured in the drillability factor, K. Hence, the term $a_5 g_p$ disappears from both Equation 1 and Equation 20, and a constant is substituted for $g_p$ in the calculation of $a_6$. The assumption of constant $g_p$ is valid in a normally pressured formation, but is invalid in an abnormally pressured zone.

Identification of Abnormally Pressured Formations in the Absence of Direct Pore Pressure Measurement If a direct pore pressure measurement is not available, the present method calculates a normalized penetration rate in addition to the penetration rate given by Equation 1. If all parameters are known, the normalized penetration rate is as follows:

$$dD/dt)_{norm} = dD/dt/[(W/\pi d^2)^{a_1} * (N/60)^{a_2} * (BH)^{a_3} * \exp(-a_4 w + a_7(10000 - D))] \quad (23)$$

If parameters for any of the variables are not known, the corresponding terms are omitted from Equation 23.

When both PRE scores and normalized penetration rate values increase simultaneously over a specified interval, the method identifies the new data as possibly representing an abnormally pressured zone.

Identification of Tops of Abnormally Pressured Formations in the Absence of Direct Pore Pressure Measurement Starting from the present depth and considering a previously drilled interval, the method calculates a second order least squares expression using part of the most recent data and performs a first order least squares on the balance of the data. The method then calculates and sums the variance over each interval. In subsequent operations, the method includes steps to increment the data set and repeat the preceding variance analysis until all of the data in the defined interval have been included in the second order curve.

The minimum total variance represented by some combination of second order and linear models is chosen as the optimal combination. The intersection of the first order and second order models identifies the deflection point which represents the top of the abnormally pressured zone as shown in FIG. 2.

The present method temporarily suspends displays of the expected, controllable unit cost output, and calculates estimates of the pore pressure based on a modified "d exponent" procedure. Operating personnel can request tabular or graphic displays of this empirical estimate of formation pore pressure during the interval in which the normal operating mode of the method has been suspended.

Pore Pressure Calculation Based on a Modified D-Exponent

A d-exponent is calculated as follows:

$$d_{exp} = \frac{\log((dD/dt)/60N)}{\log(12W/1{,}000\, d_b)} \quad (24)$$

A modified $d_{exp}$, $d_{mod}$, is given as follows:

$$d_{mod} = d_{exp} * \rho_n / \rho_E \quad (25)$$

where $\rho_n = 9.0$

An estimate of pore pressure, $g_p$, is given by the following empirical expression:

$$g_p = 7.65 \log [(d_{mod})_n - (d_{mod})] + 16.5 \quad (26)$$

where:

$(d_{mod})_n$ = extrapolated normal penetration rate trend.

The present procedure returns to the normal operating mode when the PRE score returns to a defined level, i.e., less than the threshold value. The PRE score is based on new parameter values and a new drillability factor calculated from data that includes the abnormally pressured region.

Equivalent Circulating Density

The equivalent circulating density, $\rho_E$, is an approximation of the fluid density which, under noncirculating conditions, yields a bottom hole pressure equivalent to the bottom hole pressure observed under circulating conditions. As used in the present method, $\rho_E$ is based on the following expression:

$$\rho_E = \frac{P_c + P_{fa} + (0.052 * \rho_{fa} * D)}{0.052 * D} \quad (27)$$

where:

$P_{fa}$ = frictional pressure loss in the annulus 0.052 = constant based on field engineering units The frictional pressure loss in the annulus and the average fluid density are inputs to the equivalent circulating density, and their calculation is described in Equations 2–17.

D. Calculation of Parameters for Variables in Penetration Rate Model

The present method calculates parameters $a_1$ to $a_7$ for the variables in a predictive penetration rate model such as Equation 1. These unique constants make the model dynamic because they reflect the drilling conditions and lithology of the hole as it is being drilled. Parameters $a_1$, $a_2$, $a_3$, and $a_6$ are calculated with a technique called transition point analysis which is also used to calculate parameter $a_5$ if a pore pressure measurement is available. Parameters $a_4$ and $a_7$ are calculated with a regression procedure.

If the bit type remains unchanged, the parameters $a_1$ to $a_7$ should remain unchanged over a given bit run. However, in order to insure that the extrapolation of the penetration rate model closely approximates the next interval to be drilled, the parameters are calculated from data representing some specified interval drilled just prior to the present depth. For example, if the bit is at 8800 feet, data from an interval drilled prior to the 8800 foot depth are used to calculate $a_1$, $a_2$, $a_3$, $a_5$, and $a_6$.

Parameter $a_4$ is estimated from a prior bit run while parameter $a_7$ is calculated for the entire interval drilled from the beginning of the well. Because the parameters are calculated over an extended depth interval, they may reflect data from different types of lithologies.

Data are acquired continuously as long as the bit type is the same, even if a trip to replace the bit occurs during the interval. If the bit type changes, a new interval must be drilled or a minimum amount of data must be acquired. If a minimum amount of data has not been collected during the current bit run, the penetration rate model uses parameters from a bit run prior to the current bit run.

Parameter Calculation By Transition Point Analysis

Transition point analysis is a method used to calculate selected model parameters which reflect the sensitivity of the penetration rate to changes in drilling variables as opposed to changes resulting from different types of formations. As a result, transition point analysis can be applied even when data are collected from different lithologies.

Other authors have recognized that a given penetration rate response could be due to a change in a drilling variable or to a change in lithology. However, the relative contributions of lithology changes versus drilling variable changes were indistinguishable due to the summation procedure of the regression analysis that was usually employed. In an attempt to avoid this restriction, other authors specified that the parameters and coefficients should be calculated with a regression procedure only if the data were known to be from constant lithology such as shale.

The present method is not limited by the preceding constraint; the sensitivity of the penetration rate to changes in drilling variables can be calculated regardless of the lithology. Transition point analysis is used to calculate the parameters $a_1$, $a_2$, $a_3$, $a_5$, and $a_6$ which are measures of the sensitivity of the penetration rate to a change in weight on bit, rotary speed, bit hydraulics, pore pressure, and equivalent circulating density, respectively.

Transition point analysis is based on identifying points at which the penetration rate has changed due to a change in a drilling variable. The examination of the penetration rate data occurs over a very small drilling interval and thus is unlikely to include lithology-induced fluctuations.

By definition, variables whose parameters are not being calculated at the transition point in question must remain constant or the penetration rate must be normalized for their effects. An example of the calculation of the parameter $a_2$ for rotary speed, N, by transition point analysis is as follows:

$$\frac{dD/dt_1}{dD/dt_2} = \frac{C_{eff1} * (N_1/60)^{a_2}}{C_{eff2} * (N_2/60)^{a_2}} \quad (28)$$

where: $C_{eff}$ represents all other terms in Equation 1 which remain constant so $C_{eff1} = C_{eff2}$. Thus:

$$\text{thus } a_2 = \frac{\log(dD/dt_1 / dD/dt_2)}{\log(N_1/N_2)} \quad (29)$$

If more than one variable changes at the transition point, such as both bit weight and rotary speed, the penetration rate model can be normalized for the effects of one of the variables prior to calculating the parameter for the other variable. Normalization of the model for a change in weight on bit prior to the calculation of $a_2$ for rotary speed is as follows:

$$dD/dt)_{1 \text{ normalized}} = \frac{(dD/dt)_1}{(W_1/\pi d^2)^{a_1}} \quad (30)$$

$$dD/dt)_{2 \text{ normalized}} = \frac{(dD/dt)_2}{(W_2/\pi d^2)^{a_1}} \quad (31)$$

The normalized penetration rates are substituted for $dD/dt_1$ and $dD/dt_2$, respectively, in Equation 29. In order to calculate $a_1$ or $a_2$ at a transition point where both variables have changed, it is necessary that one of the parameters is already known. Therefore use of the present method is based on some initial transition point where only one variable changes before evaluating subsequent transition points with multiple variable changes.

If data on single variable transition points are not available in the course of routine operations, the method causes a computer display to generate a message requesting that values of the variables of interest be fractionally changed. Alternatively, data from a conventional drill-off test can be incorporated in the method at the discretion of operating personnel.

The calculated parameters measure the sensitivity of the penetration rate of the bit to the individual drilling variables exclusive of significant lithology-induced fluctuations. However, the type of lithology in which the parameters are calculated has some effect on the relative magnitude of the parameters. For example, a set of parameters calculated in sand may differ from a set of parameters calculated in shale. Unless operating personnel specify otherwise, the method assumes that the mix of formations to be drilled will approximate the mix of formations previously drilled. As a result, each of the parameters applied in the predictive penetration rate model is an average value based on transition points that may have occurred in different lithologies. The calculation of an average value for each parameter is as follows:

$$\bar{a} = \sum_{i=1}^{n} a_i/n \quad (32)$$

where:
$\bar{a}$ = average parameter value
$a_i$ = calculated parameter
n = total number of transition points Because the method uses average parameters which are expected to more accurately reflect the mix of formations to be drilled, operating personnel are not restricted to applying the output of the model to zones of known lithology.

Parameter Calculation by Regression Analysis

Parameters $a_4$ and $a_7$ are calculated for bit wear and depth by a regression procedure. Under normal conditions, changes in these variables occur gradually, and a longer drilling interval can be used for evaluation. The longer interval of analysis permits smoothing of variations that may be attributed to lithology fluctuations.

E. Intermediate Calculations

The objective of the present method is to calculate expected, controllable unit costs resulting from a simulation of operating variables. However, before this can be accomplished, the incremental depth and time that can be drilled by the bit currently in the borehole must be calculated. Other intermediate calculations that must be performed include estimates of formation abrasiveness and bit wear.

Average Values of Weight on Bit and Rotary Speed

The method uses average values of both weight on bit and rotary speed, W and N, which are calculated for an interval drilled by a previous bit. These values are used in subsequent expressions for bit wear and formation abrasiveness.

$$\bar{W} = \sum_{i=1}^{n} W_i/n \quad (33)$$

where:
$\bar{W}$ = average value of weight on bit $W_i$ = individual observations of weight on bit taken at regular intervals n = total number of observations
An average value for $\bar{N}$ is calculated similarly.

Formation Abrasiveness

The lithology encountered during a previous bit run is selected as an approximation to the lithology of the current bit run. Unless otherwise specified by operating personnel, the method uses the value of formation abrasiveness, $\tau_H$, from a previous bit run as a proxy for the value of $\tau_H$ for the current bit run.

An expression for the formation abrasiveness of a previous bit run is as follows:

$$\tau_H = \frac{t_{bp}}{C_{1p} * (w_p + H_2(w_p^2/2))} \quad (34)$$

where: the subscript, p, indicates values from a previous bit run $t_{bp}$ = drilling time of previous bit
$H_1$, $H_2$ = constants based on bit class
$C_{1p}$ = composite constant defined as:

$$C_{1p} = \left[\frac{(W/d_b)_m - \overline{W}/d_b}{(W/d_b)_m - 4}\right] * (60/N)^{H_1} * (1/(1 + H_2/2)) \quad (34a)$$

Bit Wear

An expression for the rate of bit wear, $dw/dt$, based on formation abrasiveness, rotary speed, weight on bit, and bit type is as follows:

$$dw/dt = \quad (35)$$

$$1/\tau_H * [N/60]^{H_1} * \frac{(W/\pi d^2)_m - 4}{(W/\pi d_b^2)_m - W/\pi d^2} * \frac{1 + H_2/2}{1 + (H_2 \times w)}$$

where:
$dw/dt$ = instantaneous rate of bit wear
$H_3$ = constant based on bit class

Bearing Wear

In an optional mode, the present invention incorporates an estimate of bearing wear as a limiting factor in calculating the incremental time and depth the bit in the borehole can be expected to drill.

A bearing wear relationship is as follows:

$$db/dt = 1/\tau_B(N/60)^{B_1}*(W/4d_b)^{B_2} \quad (36)$$

where:
$\tau_B$ = bearing wear constant
$B_1$, $B_2$ = bearing wear exponents
and:

$$t_b = C_3 * \tau_B * b_f \quad (37)$$

where:
$t_b$ = time to complete bearing wear $$C_3 = (60/N)^{B_1}*(4d/W)^{B_2} \quad (37a)$$

$b_f$ = final estimate of extent of bearing wear

Depth to Complete Bit Wear

The total depth interval to complete bit wear, $\Delta D_6$, corresponding to $w = 1.0$, is based on integrating a combination of a predictive penetration rate model (Equation 1) and the instantaneous bit wear expression (Equation 35). The expression for depth to complete bit wear is as follows:

$$\Delta D_b = C_1*C_2*\tau_H*[(1-e^{-a_4})/a_4+(H_2(1-e^{-a_4}-a_4e^{-a_4})/a_4^2] \quad (38)$$

where: $C_2$ = composite constant $$C_2 = K*(\overline{W}\pi d)^{a_1}*(\overline{N}/60)^{a_2}*(BH)^{a_3}* \exp(a_5(g_p)+a_6(g_p-\rho_E)+a_7(10000-D_{avg})) \quad (38a)$$

where:

$$D_{avg} = D_{initial} + \tfrac{1}{2}\Delta D_b$$

Because $D_{avg}$ is a function of $\Delta D_b$, $\Delta D_b$ is determined with an iterative solution.

The remaining interval to complete bit wear, $\Delta D_r$, is the difference between the total interval to complete wear and the interval already drilled, $\Delta D_d$, as follows:

$$\Delta D_r = \Delta D_b - \Delta D_d \quad (39)$$

Time to Complete Wear

Equation 34 can be rearranged to solve for $t_b$, the time to complete bit wear for the current bit, i.e., the time required to reach $w = 1.0$. This is calculated as follows:

$$t_b = C_1*\tau_H*(1+H_2/2) \quad (40)$$

where: $C_1$ is based on values from the current bit

The remaining time to complete bit wear, $t_r$, is the difference between the total time to wear and the current time, $t_{actual}$:

$$t_r = t_b - t_{actual} \quad (41)$$

F. Total Expected Controllable Unit Cost Calculations

The present method computes the total expected, controllable unit cost, E(unit cost), based on allocating future controllable cost components over a future drilling interval. The expected, controllable unit cost expression includes bit costs and operating costs of the rig and, in in the normal operating mode, performs the cost analysis over the remaining interval that can be drilled by the current bit.

A bit depreciation function, $f(t)$, describes the manner in which the value of the bit changes due to rotation in the hole. Bit depreciation is treated as a function of bit wear which is assumed to follow the model given in Equation 35. In the present method, depreciation of the bit can follow either an exponential or linear model. The exponential bit depreciation model assumes that the value of the bit decreases exponentially with rotating time whereas the linear bit depreciation model assumes that bit depreciation is proportional to bit rotating time.

In the normal operating mode, the present method uses the exponential model for bit depreciation. However, operating personnel have the option to select the linear bit depreciation model if they believe it is a better approximation of the actual change in value of the bit. The expressions used for both methods are discussed as follows:

The general form of the bit depreciation expression is as follows:

$$C_{bs} = C_b*f(t) \quad (42)$$

where:

$C_{bs}$ = residual bit value
$C_b$ = initial bit cost
$f(t)$ = bit depreciation function The exponential form of the bit depreciation function is as follows:

$$f(t) = a*e(=b*t) \quad (43)$$

where:

$t$ = rotating time of the bit
$a = 1.0$
$b = (-A/t_b)*\ln(S/C_b)$ $t_b$ = total time required to drill to complete wear
$S$ = bit salvage value at some specified degree of bit wear
$1/A$ = ratio of rotating time to total rotating time at the specified degree of bit wear The linear form of the bit depreciation function is as follows:

$$f(t) = t_r/t_p \qquad (44)$$

where:

$t_r$ = time required to drill to complete wear

The total expected, controllable unit cost expression is as follows:

$$E(\text{unit cost}) = \frac{(C_b * f(t_r)) + (C_r * t_r)}{\Delta D_r} \qquad (45)$$

where:
 $C_b$ = initial bit cost
 $f(t)$ = bit depreciation function
 $C_r$ = rig operating cost of customer charges per unit time
 $t_r$ = estimated time to complete bit wear
 $\Delta D_r$ = remaining interval that can be drilled FIG. 3 illustrates how the expected, controllable cost per foot changes with respect to the depth to complete wear.

From an historical cost accounting perspective, tripping costs should be include in a unit cost calculation since they are a significant component of controllable drilling costs. However, the present method is based on future, controllable costs that are components of a real-time cost accounting expression. Consequently, the present method does not consider tripping costs as expected, controllable costs since for the current bit, tripping costs have already been incurred and thus are not controllable over a future drilling interval.

Bit Costs

The present method allocates bit costs over a future drilling interval in a manner approximating the actual change in value of the bit. In the normal operating mode, an exponential depreciation pattern, given in Equation 43, is used to estimate the depreciation of the bit over the entire interval it is expected to drill, $\Delta D_r$. In an optional mode, operating personnel can select a linear bit depreciation model given in Equation 44.

The present method can allocate bit costs over an interval less than $\Delta D_r$ if operating personnel can estimate the residual bit value at the end of the specified interval. Either the exponential or linear bit depreciation functions can be applied if this option is selected.

Another option available to drilling personnel is the use of a net bit cost instead of the original bit cost. The present method calculates the net bit cost by subtracting the salvage value of the bit at complete wear from the initial bit cost, $C_b$. The net bit cost is then taken as the bit value to be prorated over a future drilling interval.

Rig Operating Costs

The premise of the present invention is that future controllable drilling costs can be minimized by optimizing the penetration rate through the proper selection of real-time values for operating variables. As a result, the time required to drill to a given depth, $t_r$, can be minimized and the expected operating costs of the rig, which are a function of $t_r$, can similarly be minimized.

In the normal operating mode, the present method extrapolates the expected, controllable unit cost over the entire interval remaining to be drilled with the bit in the hole, $\Delta D_r$; alternatively, the present method can project the expected, controllable unit cost over some lesser interval. In the normal operating mode, the present method includes displaying the expected, controllable unit cost over the entire future interval; however, operating personnel have the option to request a similar graphical output based on any interval of their choice.

G. Output of the Model (1) Weight on Bit and Rotary Speed Simulation

In the normal operating mode, the output of the present program is a display of the total expected, controllable unit cost resulting from a simulation of selected operating variables such as weight on bit, rotary speed and bit hydraulics. For the selected combination of variables, the method holds the remaining variables in Equation 1 constant while calculating the depth and time to complete wear and the total expected, controllable unit cost over this interval.

The expected, controllable unit cost values resulting from each combination of variables are tabulated and stored in memory. In one method of presentation, they are displayed as iso-cost-per-foot curves on a computer monitor. This graphical format provides a convenient visual reference for drilling personnel who can compare current values of the selected variables to values that will yield the lowest expected, controllable unit cost. An example of the output as it might be displayed is shown in FIG. 4.

(2) Simulation of Other Operating Variables

Variables other than weight on bit, rotary speed, and bit hydraulics in the penetration rate model of Equation 1 can also be simulated and the effects on the expected, controllable unit cost can be calculated.

For example, if the drilling personnel expect a higher pressure formation to be encountered and anticipate that the mud weight, $\rho_m$, should be adjusted accordingly, they can input a new value for the mud weight and request a revised expected, controllable unit cost table. Similarly, bit wear estimates, bit hydraulics, or any of the variables directly or indirectly affecting the penetration rate expression can be simulated either separately or in combination, and a new expected, controllable unit cost table can be generated.

The present method can also convey information regarding the sensitivity of the penetration rate to any of the components of the penetration rate expression. For example, if bit hydraulics are found to be highly correlated with the penetration rate, this information can be displayed in a graph of penetration rate versus bit hydraulics.

(3) Formation Simulation

In addition to simulating operating variables, the present program can simulate the effects of different types of formations on a real-time basis. If drilling personnel expect to encounter a formation similar to one drilled previously, they can request an expected, controllable unit cost table for the interval already drilled. For example, if drilling personnel are operating at at drill depth of 9,400 feet and wish to examine the expected, controllable unit cost table based on a simulation for a similar formation that was encountered between 6,780 and 6,905 feet, they only have to input these two depths. The present program will automatically combine the current values of drilling variables with the parameters $a_1$ to $a_7$ from the previous interval and display the resulting expected, controllable unit cost table. Several options of this type are available to drilling personnel who can selectively combine variables and parameters from different intervals.

Figure 5:
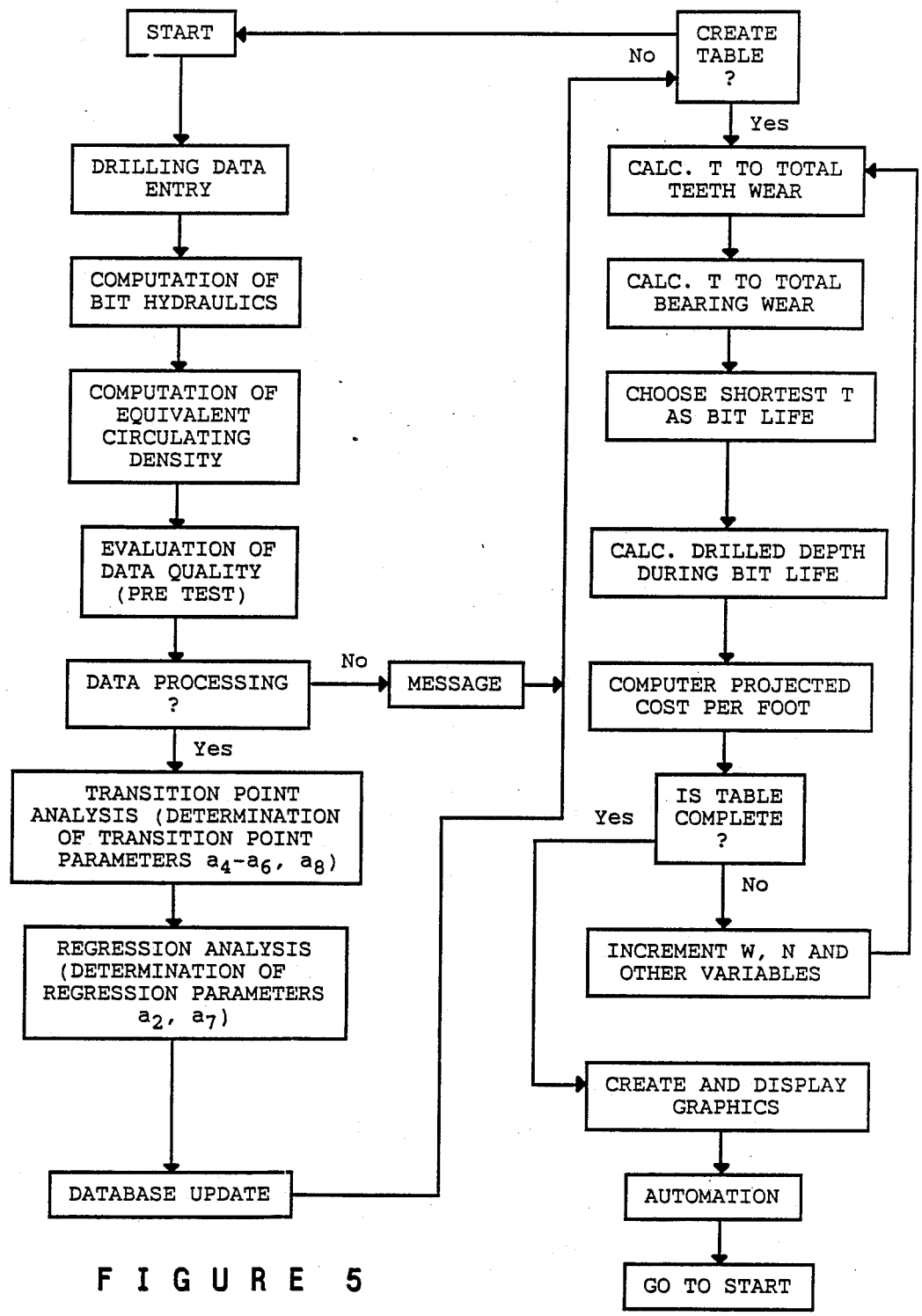
FIG. 5 is a flowchart illustrating the method of the present invention.

Having described the present method in terms of various Equations and expressions evaluated for optimizing drilling costs on a real-time basis, a summary of the method steps illustrated in FIG. 5 will now be provided.

The present method acquires data on a real-time basis through a data acquisition system for obtaining drilling operating variables including: drilling depth, time, rate of penetration of the bit, weight on the bit, rotary speed of the bit, "D" exponent, stand pipe pressure, annulus pressure and mud density. Systems that monitor and provide this data include Visulogger manufactured and sold by TOTCO; DATA-SENTRY manufactured and sold by Geolograph/Pioneer, and Data Star manufactured and sold by Magcobar/Dresser Industries. The values of real-time drilling operating variables obtained through the aforementioned data acquisition systems are stored in direct access data files of the software of the present invention.

Additionally, mud and bit values are accessed on a real-time basis or from previously stored values in a data file of the software of the present invention. These mud properties are generally acquired manually and entered into a data acquisition system for use on a real-time basis. Mud or drilling fluid variables include the following: density of the cuttings, diameter of the cuttings, mud rotational viscometer readings, apparent viscosity of the drilling fluid, yield point of the drilling fluid, mud consistency index, and the mud flow behavior index. A calculated value of the equivalent circulating density of the drilling fluid can be determined from the preceeding data and certain additional well information.

The present method quantifies the sensitivity of the penetration rate to individual operating variables exclusive of lithology fluctuations. This is accomplished by using transition point analysis, a technique that generates real-time parameters which are either exponents or coefficients for the real-time variables in a multivariate penetration rate model. The parameters are calculated by identifying successive intervals of depth or time wherein one or more of the variables comprising a penetration rate model changes and generates a contemporaneous change in the penetration rate.

Transition point analysis is used to calculate real-time parameters $a_1$, $a_2$, $a_3$, $a_5$, and $a_6$ using Equations 28–32. Regression analysis is applied to calculate parameters $a_4$ and $a_7$.

In the application of transition point analysis, the first penetration rate expression based on the first data set is divided by the second penetration rate expression based on the second data set. By definition, all terms in the penetration rate expression other than the variable that has been observed to change remain constant. The constant terms are eliminated from both penetration rate expressions, and a solution based on the logarithm of the remaining terms is established. In the numerator of the remaining expresson, the first penetration rate value is divided by the second penetration rate value and the log of the resulting term is taken. In the denominator of the remaining expression, the first value of the variable of interest is divided by the second value of the same variable and the log of the resulting term is taken. Dividing the numerator by the denominator yields a parameter value for the variable of interest.

If more than one variable changes at a given transition point, the penetration rate model is normalized for the effects of one of the variables prior to calculating a parameter for the variable of interest. The normalization procedure (Equations 30 and 31) consists of dividing the penetration rate value at both points of interest by the variable and corresponding parameter not to be calculated. The normalized penetration rate values are substituted for the penetration rate values in the numerator of Equation 29 used to calculate the parameter of interest.

Software for carrying out the present invention smoothes the effects of different types of lithology on the parameter values by retrieving previously stored values of parameters and calculating average values of these parameters using Equation 32. The average values are determined by dividing the sum of all values calculated for the parameters of interest by the number of observations recorded for each parameter over the interval of the evaluation.

The average values of selected operating variables are calculated using Equation 33. These average values are computed by dividing the sum of the values of each of the operating variables of interest by the number of observations of each variable recorded over the interval of interest.

The formation drillability factor, K, which is based on real-time data acquired during a specified drilling interval, is calculated using Equation 20. The formation drillability factor is calculated by dividing the sum of all real-time penetration rate values observed over the interval of interest by the sum of all terms in the penetration rate expressions corresponding to each of the observed penetration rate values. Alternatively, K can be calculated with a regression procedure.

The formation abrasiveness is calculated using Equation 34. The abrasiveness is calculated by dividing the time required to drill the formation of interest by a term that incorporates values of selected real-time operating variables, bit constants and a value of bit wear.

The process of the present invention continues by formulating a real-time, predictive penetration rate expression such as given by Equation 1. For a specified set of real-time data, the penetration rate expression describes observed values of the penetration rate of a bit in terms of a multivariate mathematical expression which includes the previously defined parameters and variables.

An important aspect of the present invention is the ability of the present method to estimate future values of the penetration rate of a drill bit by extrapolating a real-time penetration rate expression over a future drilling interval. The extrapolation, used to calculate the PRE statistic, for example, utilizes average values of the controllable operating variables and successively incremented values of the non-controllable variables. By iteratively solving a multivariate, predictive penetration rate expression such as Equation 1, together with a bit wear expression such as Equation 35, the penetration rate expression can generate expected penetration rate values over a future drilling interval. As previously described, FIG. 1 depicts an extrapolation of the penetration rate expression.

As previously stated, the present invention quantifies the accuracy of a real-time, predictive penetration rate expression. The next step in the process of the present invention is to calculate a predictive variance statistic, PRE, using Equation 18. PRE is calculated over an interval represented by the difference between the total number of observed penetration rate values and the minimum number of observations required to establish predictive penetration rate values. The square root of the sum of the squared differences between observed penetration rate values and predicted penetration rate values is taken over the interval previously defined. The resulting square root term is divided by the number of observations in the interval previously defined. The predictive ability of the penetration rate expression is then assessed on the basis of the calculated PRE score.

Limits of the predictive statistic are correlated with intervals of sufficient agreement between predicted and observed values of the penetration rate. Values of the predictive statistic that exceed specified limits provide an output to temporarily suspend simulations and optimizations.

Using Equation 19, the variable contributions to the predictive capacity of the penetration rate model are quantified. The variables are sequentially incorporated in the penetration rate model and a predictive statistic based on some interval of interest is calculated. The difference between the predictive statistic calculated following the addition of a given variable and the predictive statistic obtained just prior to the inclusion of the variable in the penetration rate model represents the contribution of the variable to the predictive ability of the model.

Differentiation among variables describing similar mechanisms is then performed. The varible of interest is incorporated in a predictive penetration rate model such as Equation 1. If a predictive statistic based on the revised penetration rate model consistently declines over multiple intervals of evaluation, the variable of interest is included in the predictive penetration rate model as an additional variable or is substituted for a variable representing the same drilling mechanism and previously incorporated in the penetration rate model.

If multiple penetration rate models are available, differentiation among said penetration rate models is then performed by comparing the predictive statistic of each penetration rate model as computed with the same real-time drilling data set. The penetration rate model that yields the lowest predictive statistic is identified as the best predictive expression and is selected for subsequent calculations requiring a predictive penetration rate model. Hence, the predictive penetration rate model used in this invention is not limited to Equation 1.

The software continues in the process of the present method to determine if abnormally pressured formations are encountered. The method uses Equation 23 to compute comprehensive normalized penetration rate values by dividing the observed penetration rate values by all terms in the penetration rate expression except the terms that include a formation pore pressure value. The comprehensive normalized penetration rate values are computed over some interval of interest and compared with the predicted residual error scores over the same interval. When both indices increase simultaneously, the interval is indentified as possibly including an abnormally pressure formation.

The present method further determines the beginning of an abnormally pressured subsurface formation by combining first order and second order expressions. Using an iterative fashion, the comprehensive normalized penetration rate data in the interval of interest are sequentially incorporated in a second order expression. The method computes the variance represented by the sum of the absolute difference between the calculated values in both the first and second order expressions and the actual comprehensive normalized penetration rate values. The data set with the minimum total variance is identified as the optimal combination, and the intersection of the first order and second order curves is identified as the beginning of the abnormally pressured formation.

The software of the present invention then calculates the composite constants $C_1$ and $C_2$ as defined in connection with Equations 34(a) and 38(a). The total depth to complete bit wear is then calculated using Equation 38. The remaining depth to complete bit wear is calculated with Equation 39.

The total time to complete bit wear is calculated using Equation 40, and the remaining time to complete bit wear is calculated using Equation 41. In an optional mode, the values of depth and time can be based on bit bearing wear as opposed to the surface wear of the bit. This procedure, which is given by Equations 36 and 37, is based on subjective estimates of the real-time extent of bit bearing wear.

A bit depreciation function representing the real-time change in the monetary value of the bit in the hole is then calculated using the software of the present invention by evaluating Equations 42–44. The bit depreciation function is extrapolated over a future drilling interval to determine the amount of bit-related costs required to drill the interval.

The total expected, controllable drilling cost per unit length is then calculated by using Equation 45. The present invention provides for a real-time method for estimating the expected, controllable unit drilling cost over a future drilling interval. The expected, controllable unit cost incorporates controllable cost components including future drill bit costs and future drilling rig operating costs (or drilling rates charged to customers) and divides the sum of these costs by a specified future drilling interval up to and including the remaining depth to complete drill bit wear.

An additional aspect of the present invention is a simulation of the effects on the expected, controllable unit cost by utilizing different values of selected operating variables, parameters, coefficients, lithologies or combinations thereof. The present method of simulation is performed automatically in real-time by incrementing or decrementing values of selected operating variables or by manual data changes made by the operating personnel when such variables are displayed on an output device. A visual output of such a simulation can be provided in a graphical or tabular format on a display device. The expected, controllable unit cost(s) based on a simulation of different combinations of selected variables, parameters, coefficients or lithologies are then displayed. Such a display is shown in FIG. 4 as previously described.

If operating personnel expect to encounter a formation whose lithology is similar to a formation previously encountered, a simulation of the lithology of the previous data set can be conducted. The simulation is performed by inputting the depths representing the top and bottom of the previously drilled subsurface formation. The present invention automatically retrieves the values of real-time operating variables, parameters, and coefficients of the penetration rate expression used during drilling of the formation of interest and uses these values in the simulations previously described.

The method of the present invention concludes by terminating the real-time simulations and storing accumulated real-time data to a storage device such as a hard disk with the appropriate well and drill bit identification.

Therefore, it can be seen that the present method minimizes the total expected, controllable cost per unit length over a future drilling interval by simulating values of selected operating variables, parameters, and lithologies. The present method includes a real-time, multivariate, predictive penetration rate model which incorporates variables and parameters that uniquely describe the penetration rate pattern of a drill bit. The method describes a predictive variance statistic which determines the significance of each variable in the penetration rate model, evaluates the predictive ability of the model, quantifies data quality and evaluates new variables for possible inclusion in the penetration rate model. Based upon the selected real-time, predictive penetration rate model, the present method projects the incremental depth and time the current bit in the borehole can drill and calculates the total expected controllable unit cost over this future drilling interval.

A computer software program for accomplishing the present method is attached hereto as an appendix.

Whereas the present invention has been described with respect to specific embodiments thereof, it will be understood that various changes and modifications will be suggested to one skilled in the art and it is intended to encompass such changes and modifications as fall within the scope of the appended claims.

APPENDIX

METHOD FOR OPTIMIZATION
OF DRILLING COSTS

```
C
C
C
C
C
C
C
C
C
C
C
C
C PROGRAM FOR GENERATION OF COST PER FOOT TABLE.
C COST PER FOOT IS CALCULATED AS A FUNCTION OF:
C   *   ROTARY SPEED
C   *   WEIGHT ON BIT
C   *   BIT HORSEPOWER
C   *   DEPTH
C   *   PRESSURE OVERBALANCE
C   *   FORMATION POREPRESSURE
C   *   BIT TYPE AND FORMATION ABBRASIVENESS
C
C NOMENCLATURE:
C   N1,N2,N3 - BIT CLASSIFICATION NUMBERS
C   MTYP  -  MUD TYPE TRACER
C   H1,H2 -  TOOTH WEAR PARAMETERS
C   B1,B2 -  BEARING WEAR PARAMETERS
C   WDMAX -  MAXIMUM BIT WEIGHT (KLB/IN)
C   DAVG  -  AVERAGE DRILLING DEPTH (FT)
C   GP    -  PORE PRESSURE GRADIENT    (G)
C   ECD   -  EQUIVALENT CIRCULATING DENSITY (PPG)
C   HPB   -  BIT HORSEPOWER (HP)
C   CB    -  BIT COST ($)
C   CR    -  RIG COST ($)
C   TT    -  TRIP TIME (HRS)
C   TC    -  CONNECTION TIME (MIN/STAND)
C   SL    -  LENGTH OF STAND (FT)
C   A7,A5,A6,A1,A2,A4,A3 - PEN.RAT.EQN.PARAMETERS
C   AB    -  BIT AREA (SQ.IN.)
C   TAUH  -  FORMATION ABBRASIVENESS (HRS)
C   TAUB  -  BEARING WEAR CONSTANT (HRS)
C   XK    -  FORMATION DRILLABILITY (FT/HR)
C   XN    -  ROTARY SPEED (RPM)
C   WD    -  BIT WEIGHT (KLB/IN)
C   XNMIN -  POSITION OF FIRST ROW
C   WDMIN -   ,,    ,,    ,,   ,,    COLUMN
C   C1    -  GROUP OF VARIABLES IN TOOTH WEAR EQN.
C   C3    -  GROUP OF VARIABLES IN BEARING WEAR EQN.
```

```
C  C2 - GROUP OF VARIABLES IN PEN. RATE EQN.
C  I,J - LOOP TRACERS
C  NN - LAST COLUMN INDICATOR
C  RAT - PENETRATION RATE (FT/HR)
C  TACT - TIME TO DATE (HRS)
C  DACT - DEPTH DRILLED BY BIT TO DATE (FT)
C
       CHARACTER M
       DIMENSION CPF(40,40),XN(40),WD(40)
C  OPEN FILE WITH DRILLING DATA
       OPEN(1,FILE='DRLDAT',STATUS='OLD')
     2 CONTINUE
C      WRITE(*,3)
C    3 FORMAT(1X,'ENTER BIT CLASS (F.E. 1 3 2)')
       READ(1,4)N1,N2,N3
       WRITE(*,50)N1,N2,N3
     4 FORMAT(3I2)
C
C      WRITE(*,5)
C      WRITE(*,6)
C      WRITE(*,7)
C      WRITE(*,8)
C      WRITE(*,9)
C    5 FORMAT(1X,'ENTER MUD TYPE.     ENTER 1 FOR BARITE MUD')
C    6 FORMAT(1X,'                    ENTER 2 FOR SULFIDE MUD')
C    7 FORMAT(1X,'                    ENTER 3 FOR WATER')
C    8 FORMAT(1X,'                    ENTER 4 FOR CLAY/WATER MUD')
C    9 FORMAT(1X,'                    ENTER 5 FOR OIL-BASED MUD')
       READ(1,10)MTYP
       CALL BTCLS(N1,N2,N3,MTYP,H1,H2,WDMAX,B1,B2)
       WRITE(*,*)'N1,N2,N3,MTYP:',N1,N2,N3,MTYP
       WRITE(*,*)'H1,H2,WDM,B1,B2',H1,H2,WDMAX,B1,B2
    10 FORMAT(I2)
C      WRITE(*,20)
C   20 FORMAT(1X,'ENTER AVG. DEPTH OF RUN, GP, ECD, AND BIT HP')
       READ(1,21)DAVG,GP,ECD,HPB
    21 FORMAT(F9.2,F6.3,F6.3,F8.2)
C      WRITE(*,22)
C   22 FORMAT(1X,'ENTER BIT DIAMETER, F5MAX, THRESHHOLD BIT WT.')
       READ(1,23)DB,F5MAX,WDT
    23 FORMAT(3F7.4)
C      WRITE(*,24)
C   24 FORMAT(1X,'ENTER PARAMETERS A7,A5,A6,A1,A2,A4,A3')
       READ(1,25)A7,A5,A6,A1,A2,A4,A3
    25 FORMAT(7F10.7)
C      WRITE(*,26)
C   26 FORMAT(1X,'ENTER BIT COST, RIG COST, TRIP TIME, CONNECTION'
C     *TIME, PIPE SECTION LENGTH,DEPTH DRILLED, ITME DR., BIT SALV.VAL'
       READ(1,27)CB,CR,TT,TCM,SL,TACT,DACT,S
    27 FORMAT(2F9.1,2F6.1,F5.1,F7.4,F7.1,F9.2)
C  SUBROUTINE OFSET OFFERS THE OPTION TO ENTER OFFSET BIT RUN DATA
C  FOR THE EVALUATION OF TAOH, TAOB, AND K OR TO ENTER THOSE
C  PARAMETERS DIRECTLY.
       CALL OFSET(X,TAOH,TAOB,XK)
       IF(MTYP.EQ.1)M='BARITE MUD'
       IF(MTYP.EQ.2)M='SULFIDE MUD'
       IF(MTYP.EQ.3)M='WATER'
       IF(MTYP.EQ.4)M='CLAY/WATER MUD'
       IF(MTYP.EQ.5)M='OIL-BASED MUD'
       WRITE(*,28)M
    28 FORMAT(1X,A)
       WRITE(*,29)DAVG
```

```
   29 FORMAT(1X,'Average Depth: ',F7.1,' ft')
      WRITE(*,30)GP
   30 FORMAT(1X,'Pore Pressure Gradient: ',F4.1,' ppg')
      WRITE(*,31)ECD
   31 FORMAT(1X,'Equiv. Circ. Density: ',F4.1,' ppg')
      WRITE(*,32)HPB
   32 FORMAT(1X,'Bit HP: ',F7.1,' HP')
      WRITE(*,33)
   33 FORMAT(1X,'Parameters : a2',8X,'a3',8X,'a4',8X,'a5',8X,
     *'a6',8X,'a7',8X,'a8')
      WRITE(*,34)A7,A5,A6,A1,A2,A4,A3
   34 FORMAT(10X,7(2X,F10.8))
      WRITE(*,35)CR
   35 FORMAT(1X,'Rig Cost :',F9.2,' $/hr')
      WRITE(*,36)CB
   36 FORMAT(1X,'Bit Cost :',F9.2,' $')
      WRITE(*,37)TACT,DACT
   37 FORMAT(1X,'Time and Depth to Date:',F7.4,' hrs',F7.1,' ft')
      WRITE(*,38)TC
   38 FORMAT(1X,'Connection Time :',F5.1,' min/stand')
      WRITE(*,39)SL
   39 FORMAT(1X,'Stand Length :',F5.1,' ft')
      WRITE(*,40)TAOH
   40 FORMAT(1X,'Abbrasiveness Constant (TaoH) :',F6.2,' hrs')
      WRITE(*,41)TAOB
   41 FORMAT(1X,'Bearing Wear Constant (TaoB) :',F6.2,' hrs')
      WRITE(*,42)XK
   42 FORMAT(1X,'Formation Drillability (K) :',F6.2,' ft/hr')
      WRITE(*,43)DB
   43 FORMAT(1X,'Bit Diameter :',F6.3,' in.')
      WRITE(*,44)F5MAX
   44 FORMAT(1X,'F5max :',F6.3)
      WRITE(*,45)WDT
   45 FORMAT(1X,'Threshhold Bit wt. :',F7.3,' klb/in')
      WRITE(*,46)S
   46 FORMAT(1X,'Value of Half Worn Bit: $',F9.2)
      PI=3.1415926
      XNMIN=20.
      DXN=10.
      XNMX=220.
      WDMIN=1.
      DWD=1.
      WDMX=6.
   50 FORMAT(1X,I4,' ',I4,' ',I4)
  100 CONTINUE
      I=1
      J=1
      XN(I)=XNMIN
      WD(J)=WDMIN
  110 CONTINUE
      C1=(WDMAX-WD(J))/(WDMAX-4.)*(60/XN(I))**H1/(1.+H2/2.)
C
      C3=(60./XN(I))**B1*(4./WD(J))**B2
C
C   CALC. TIME TO TOTAL TEETH WEAR
      TB=TAOH*C1*(1.+H2/2.)
C   CALC. TIME TO TOTAL BEARING WEAR
      TB2=TAOB*C3
C   CHOOSE SHORTEST TIME AS BIT LIFE
      IF(TB.GT.TB2)THEN
      TB=TB2
      BF=1.
```

```
      WF=((1./H2)**2.+2.*TB/(H2*C1*TAOH))**.5-1/H2
      ELSE
      WF=1.
      BF=TB/(TAOB*C3)
      ENDIF
      TR=TB-TACT
C
C  CALC. DRILLED DEPTH PREDICTION
      F1=((WD(J)-WDT)/(4.-WDT))**A1
      F2=(XN(I)/60)**A2
      AB=PI*DB**2/4.
      F3=(HPB/(3.*AB))**A3
      F5=EXP(2.303*A5*DAVG*.69*(GP-9.0))
      F6=EXP(2.303*A6*DAVG*(GP-ECD))
      F7=EXP(2.303*A7*(10000-DAVG))
      IF(F5.GT.F5MAX)F5=F5MAX
      C2=XK*F1*F2*F3*F5*F6*F7
      Y=EXP(-A4*WF)
      DDB=C2*C1*TAOH*((1.-Y)/A4+H2*(1.-Y-A4*WF*Y)/A4**2)
      DR=DDB-DACT
C
C  CALC. COST PER FOOT
C          BIT DEPRECIATION FUNCTION
C
      B=-2.*LOG(S/CB)/TB
      FT=EXP(-B*TACT)
      TC=TCM/60.*DR/SL
      CPF(I,J)=(CB*FT+CR*(TC+TR))/DR
C
C  NEXT ROT. SPEED
C
      I=I+1
      XN(I)=XN(I-1)+DXN
      IF(XN(I).LE.XNMX)GO TO 110
C  NEXT BIT WT.
C
      I=1
      XN(I)=XNMIN
      J=J+1
      WD(J)=WD(J-1)+DWD
      IF(WD(J).LE.WDMX)GO TO 110
C  WRITE RESULTS IN TABLE FORM
C
C
      WRITE(*,150)
  150 FORMAT(1H1,'       COST PER FOOT TABLE             (CPF IN $.FT)')
      WRITE(*,151)
  151 FORMAT(1X,'                                   BIT WT.(KLB/IN) ---->')
      NW=(WDMX-WDMIN)/DWD+1
      WRITE(*,166)(WD(K),K=1,NW)
  166 FORMAT(' ',' N    ',12(2X,F7.2))
      WRITE(*,167)
  167 FORMAT(1X,'_____
     *_____')
      NN=(XNMX-XNMIN)/DXN+1
      DO 180 I=1,NN
      WRITE(*,170)XN(I),(CPF(I,J),J=1,NW)
      WRITE(*,171)
  170 FORMAT(' ',F6.2,'   *  ',12(2X,F7.2))
  171 FORMAT(' ',8X,'*')
  180 CONTINUE
$DEBUG
      STOP
      END
```

```
C     SUBROUTINE FOR RETRIEVING OF BIT CLASS DATA
      SUBROUTINE BTCLS(N1,N2,N3,MTYP,H1,H2,WDMAX,B1,B2)
C     RETRIEVE BIT CLASS DATA FROM DIRECT ACCESS FILE BTCLS
      OPEN(2,FILE='BTCLS',STATUS='OLD',ACCESS='DIRECT',RECL=107)
      I=(N1-1)*12+(N2-1)*3+1
      WRITE(*,5)I,N1,N2,N3
    5 FORMAT(1X,I4,' ',I4,' ',I4,' ',I4)
      READ(2,REC=I)H1
      I=I+1
      READ(2,REC=I)H2
      I=I+1
      READ(2,REC=I)WDMAX
      I=96+N3
      READ(2,REC=I)B1
      IF(N3.EQ.1)N3=N3+MTYP+2
      I=99+N3
      READ(2,REC=I)B2
      CLOSE(2)
      RETURN
      END
C
C
C     SUBROUTINE FOR EVALUATION OF OFFSET BIT RUN DATA
C     FOR DETERMINATION OF ABBRASIVNESS CONSTANTS AND
C     DRILLABILITY CONSTANT.
      SUBROUTINE OFSET(X,TAOH,TAOB,XK)
      PI=3.1415926
      WRITE(*,10)
   10 FORMAT(1X,'ENTER OFFSET BIT LIFE(HRS),WT ON BIT(LKB),ROT SPEED(R
     *,OFFSET BIT DIAM')
      READ(1,20)X1
      READ(1,20)W
      READ(1,20)X3
      READ(1,20)DB
   20 FORMAT(F9.4)
      TB=X1
      XN=X3
      WD=W/DB
      WRITE(*,30)
   30 FORMAT(1X,'ENTER DRILLED DEPTH, FRACTION TOOTH WEAR, FRACTION
     *BEARING WEAR')
      READ(1,40)DD
      READ(1,41)X6
      READ(1,41)X7
      WF=X6
      BF=X7
   40 FORMAT(F7.1)
   41 FORMAT(F7.4)
      WRITE(*,3)
    3 FORMAT(1X,'ENTER BIT CLASS (F.E. 1 3 2)')
      READ(1,50)N1,N2,N3
   50 FORMAT(3I2)
      WRITE(*,5)
      READ(1,60)MTYP
    5 FORMAT(1X,'ENTER MUD TYPE')
   60 FORMAT(I2)
      CALL BTCLS(N1,N2,N3,MTYP,H1,H2,WDMAX,B1,B2)
      C1=(WDMAX-WD)/(WDMAX-4.)*(60./XN)**H1*(1./(1.+H2/2.))
      WRITE(*,*)C1,WF,H2
      TAOH=TB/C1/(WF+H2*WF**2./2.)
      TAOB=(XN/60.)**B1*(WD/4.)**B2*TB/BF
```

```
   70 CONTINUE
      RAT=DD/TB
      WRITE(*,80)
   80 FORMAT(1X,'ENTER AVG DEPTH,ECD,GP, BIT HP,TRESHHOLD WB,F1MAX')
      READ(1,90)DAVG,ECD,GP,HPB,WBT,F1MAX.
   90 FORMAT(F7.1,2F5.2,F7.1,F6.2,F5.2)
      WRITE(*,100)
  100 FORMAT(1X,'ENTER A7,A5,A6,A1,A2,A4,A3')
      READ(1,110)A7,A5,A6,A1,A2,A4,A3.
  110 FORMAT(7F9.7)
      AB=PI*DB**2./4.
      F1=((WD-WDT)/(4.-WDT))**A1
      IF(F1.GT.F1MAX)F1=F1MAX
      F2=(XN/60.)**A2
      F3=(HPB/(3.*AB))**A3
      F4=EXP(-A4*WF)
      F5=EXP(2.303*A5*DAVG*.69*(GP-9.0))
      F6=EXP(2.303*A6*DAVG*(GP-ECD))
      F7=EXP(2.303*A7*(10000.-DAVG))
      WRITE(*,*)'FS',F1,F2,F3,F4,F5,F6,F7
      XK=RAT/(F1*F2*F3*F4*F5*F6*F7)
      RETURN
      END
```

```
C
C
C
C          **********************************************
C          *                                            *
C          *      Drilling Data  Evaluation and         *
C          *          Processing Software               *
C          *                                            *
C          **********************************************
C
C      Software for the analysis of raw drilling data which is
C      stored in a file named COM.  The listing COMSTRUC.LST below
C      the program listing contains information on the required
C      data structure of datafile COM.
C           This software produces and stores to disk parameters for
C      use in the drilling automation programs ODC and EBCM, along
C      with the results of intermediate computations such as flowrate,
C      bit horsepower, and equivalent circulating density.
C           Processed drilling data and generated parameters are store
C      for subsequent use in the DIRECT ACCESS datafile DRLDAT2.
C           Screens which present important transient data in differen
C      manners during data evaluation are available for the user.
C
C
C
C ++++++++++++ MAIN PROGRAM +++++++++++++++++++++++++++++++++++++++++++
C
C  * Reception and organization of raw drilling data from file COM
C
C  * User I/O
C
C  * Organization of subroutines for basic drilling computations,
C    data interpretation, and screen control.
C
C  note: a flag at the beginning of each record indicates the type
C        of data in that record
C
C
C
C
C
```

```
      CHARACTER*9 DATE
      CHARACTER*9 TIME
      CHARACTER*8 LIN
      CHARACTER*7 BTYP
      CHARACTER*4 REGION
      CHARACTER*12 RIG
      CHARACTER*8 WELL
      CHARACTER AA
      CHARACTER BB
      DIMENSION GPS(5),PUD(5),PUL(5)
      COMMON /VAR/XN2,XN1,WD2,WD1,ECD2,ECD1,HPB2,HPB1
     *,ROP2,ROP1,D,DO,DI,NBIT,TBOT
      COMMON /REGRES/RDIN,IREG,NREG,RREG(30),DREG(30),WREG(30),GREG(30
C
C   INITIALIZATION
C    Call title screen
      CALL SCRNINIT(0)
      PI=3.1415926
      XN2=0
      WD2=0
      ECD2=0
      HPB2=0
      IREG=1
      NREG=1
      NVAR=1
      CALL QCMOV(0,3)
      WRITE(*,*)
     $'             Enter O for offset bit run mode'
      CALL QCMOV(0,2)
      WRITE(*,'(A\)')
     $'             Enter T for data testing mode     --->'
      READ(*,'(A1)')BB
      DFIN=100000.
      IF(BB.EQ.'T')THEN
      CALL TXTCLR(2,2)
      CALL QCMOV(0,3)
      WRITE(*,'(A\)')
     $'             Enter footage before testing    --->'
      READ(*,'(F7.1)')X
      DFIN=DIN+X
      ENDIF
      CALL TXTCLR(2,2)
      CALL QCMOV(0,3)
      WRITE(*,'(A\)')
     $'             Enter bit run No. to process    --->'
      READ(*,'(I2)')NBIT
      CALL TXTCLR(2,2)
      CALL QCMOV(0,3)
      WRITE(*,'(A\)')
     &'             Enter desired screen  (enter 1, 2, or 3) --->'
      READ(*,'(I2)')ISCRN
C
C   Call the desired screen
      CALL SCRNINIT(ISCRN)
      OPEN(1,FILE='B TOM',STATUS='OLD')
      OPEN(2,FILE='D DAT2',STATUS='OLD',ACCESS='DIRECT',RECL=20)
      OPEN(3,FILE='DRLVAR',STATUS='NEW',ACCESS='DIRECT',RECL=20)
C
C   SEARCH FOR BIT RUN NO "NBIT"
    2 CONTINUE
      READ(1,10)N1
```

```
C Flag N1=3 indicates record containing bit run number
      IF(N1.EQ.3)THEN
      BACKSPACE 1
      READ(1,40)N1,DI,IBRUN,DIAM,BTYP,I,XJ1,XJ2,XJ3,TW,BW,
     *GW,MTYP
      IF(IBRUN.EQ.NBIT)THEN
      WRITE(2,REC=64)DI
      WRITE(2,REC=44)DIAM
      WRITE(2,REC=65)IBRUN
      WRITE(2,REC=66)XJ1
      WRITE(2,REC=67)XJ2
      WRITE(2,REC=68)XJ3
      WRITE(2,REC=69)TW
      WRITE(2,REC=70)BW
      WRITE(2,REC=71)GW
      WRITE(2,REC=72)MTYP
      NFLAG1=0
      GO TO 3
      ENDIF
C Read well information stored before third bit run data
      IF(IBRUN.EQ.3)THEN
      NFLAG1=-1
      GO TO 3
      ENDIF
      ENDIF
      GO TO 2
C
C Read information pertaining to the desired bit run stored
C above the bit run data
    3 CONTINUE
      BACKSPACE 1
      BACKSPACE 1
      READ(1,10)N1
      IF(N1.EQ.5)THEN
      BACKSPACE 1
      GO TO 5
      ENDIF
      IF(N1.GT.2)GO TO 3
    5 CONTINUE
C
      READ(1,10)N1
   10 FORMAT(I2)
C
      IF(N1.EQ.1)THEN
      XN1=XN2
      XN2=XN
      WD1=WD2
      WD2=WD
      BACKSPACE 1
      READ(1,20)N1,DATE,TIME,D,DBT,WB,XN,PS1,PS2,PS3
   20 FORMAT(I2,A9,A9,2F6.0,2F7.2,3F6.0)
      IF(D.GT.DFIN)GO TO 100
      WRITE(2,REC=58)D
      WRITE(2,REC=57)DBT
      WRITE(2,REC=60)XN
      WRITE(2,REC=61)WB
      WD=WB/DIAM
      GO TO 5
      ENDIF
C
      IF(N1.EQ.2)THEN
      BACKSPACE 1
      READ(1,30)N1,DELD,WH,TBOT,TOFB,CP,PP,GAS
   30 FORMAT(I2,F8.2,F6.1,2F6.2,2F6.0,F6.1)
```

```
      WRITE(2,REC=62)TBOT
      WRITE(2,REC=63)TOFB
      WRITE(2,REC=46)PP
      WRITE(2,REC=47)CP
      ROP1=ROP2
C Calculate pen. rate.
      ROP2=(D-DO)/(TBOT-TOBO)
      DO=D
      TOBO=TBOT
      T=TBOT+TOFB
      IF(ROP1.EQ.0.)GO TO 5
C Data interpretation follows after record starting with N1=2 is rea
C Calc. flowrate from pump stroke data
      Q=(GPS(1)*PS1+GPS(2)*PS2+GPS(3)*PS3
     *)/(T-TO)
      WRITE(2,REC=42)Q
      PS1O=PS1
      PS2O=PS2
      PS3O=PS3
      TO=T
      HPB1=HPB2
      ECD1=ECD2
      CLOSE(2)
C Call routine for computation of bit horsepower and eq.circ.den.
      CALL HYDRAUL(DUMMY,HPB,ECD)
      HPB2=HPB
      ECD2=ECD
C Call routine for trans. point analysis. (computation of a1,a2,a3,
C                                                         and a6)
      CALL DPRET(ISCRN)
C
C Call routine for regression analysis. (computation of a4, a5
C                                                         and a7)
      CALL DPRET2(ISCRN)
C
C STORE VARIABLE VALUES IN DRLVAR
      CLOSE(3)
      CALL VARSTO(NVAR,ROP2,D,HPB2,ECD2,WREG(NVAR),GREG(NVAR),XN,WB)
C OPTIONAL CALL TO COMPUTE PRE STATISTIC
      CALL PRESTA(PRE)
      OPEN(3,FILE='DRLVAR',STATUS='OLD',ACCESS='DIRECT',RECL=20)
      OPEN(2,FILE='DRLDAT2',STATUS='OLD',ACCESS='DIRECT',RECL=20)
      GO TO 5
      ENDIF
C
      IF(N1.EQ.3)THEN
      IF(NFLAG1.EQ.0)THEN
      NFLAG1=1
      GO TO 5
      ENDIF
      IF(NFLAG1.EQ.-1)THEN
      NFLAG1=0
      GO TO 2
      ENDIF
      CALL TXTCLR(2,2)
      CALL QCMOV(5,1)
      WRITE(*,*) ' Start of new bit run encountered.'
32    CONTINUE
      WRITE(*,'(A\)')
     & ' Do you wish to process this bit run? (Y/N) --->'
      READ(*,'(A1)')AA
      IF(AA.EQ.'N')GO TO 100
      IF(AA.EQ.'Y')GO TO 3
```

```
   40 FORMAT(I2,F6.0,I4,F6.2,A7,I3,3F3.0,3F4.0,I2)
   41 FORMAT(1X,F6.0,I4,F6.2,A7,I3,3F3.0,3F4.0,I2)
      GO TO 32
      ENDIF
C
      IF(N1.EQ.4)THEN
      BACKSPACE 1
      READ(1,50)N1,PEFF,PUD(1),PUL(1),PUD(2),PUL(2)
     *,PUD(3),PUL(3),PTYP
   50 FORMAT(I2,F7.0,F3.0,F10.3,F3.0,F7.0,F6.0,F7.0,F6.0)
      PEFF=1.-PEFF
      WRITE(2,REC=73)PEFF
      WRITE(2,REC=74)PUD(1)
      WRITE(2,REC=75)PUL(1)
      WRITE(2,REC=76)PUD(2)
      WRITE(2,REC=77)PUL(2)
      WRITE(2,REC=78)PUD(3)
      WRITE(2,REC=79)PUL(3)
      WRITE(2,REC=80)PTYP
      GPS(1)=PUD(1)**2*PI*PUL(1)/924.06857
      GPS(2)=PUD(2)**2*PI*PUL(2)/924.06857
      GPS(3)=PUD(3)**2*PI*PUL(3)/924.06857
      GO TO 5
      ENDIF
C
      IF(N1.EQ.5)THEN
      BACKSPACE 1
      READ(1,60)N1,REGION,RIG,WELL
   60 FORMAT(I2,A4,A12,A3)
      WRITE(2,REC=81)REGION
      WRITE(2,REC=82)RIG
      WRITE(2,REC=83)WELL
      GO TO 5
      ENDIF
C
      IF(N1.EQ.6)THEN
      BACKSPACE 1
      READ(1,70)N1,DEPMM,RHOF,PV,IFVIS,IYP,APIWB,PH,IGIN,IGFIN
     *,ICHLO,ICA,WLAPTP,VAP,PM,PF,XMF
   70 FORMAT(I2,F6.0,F5.2,F3.1,2I3,F5.1,F4.1,2I3,I6,I5,2F5.1,
     *3F4.0)
      WRITE(2,REC=84)DEPMM
      WRITE(2,REC=54)RHOF
      WRITE(2,REC=49)PV
      WRITE(2,REC=85)IFVIS
      WRITE(2,REC=50)IYP
      WRITE(2,REC=86)APIWB
      WRITE(2,REC=87)PH
      WRITE(2,REC=88)IGIN
      WRITE(2,REC=89)IGFIN
      WRITE(2,REC=90)ICHLO
      WRITE(2,REC=91)ICA
      WRITE(2,REC=92)WLAPTP
      WRITE(2,REC=93)VAP
      WRITE(2,REC=94)PM
      WRITE(2,REC=95)PF
      WRITE(2,REC=96)XMF
      GO TO 5
      ENDIF
C
      IF(N1.EQ.9)THEN
      BACKSPACE 1
      READ(1,80)N1,SAND,SOLID,OIL,MTYP
```

```
   80 FORMAT(I2,2F4.1,F3.0,I1)
      WRITE(2,REC=97)SAND
      WRITE(2,REC=98)SOLID
      WRITE(2,REC=99)OIL
      WRITE(2,REC=72)MTYP
      GO TO 5
      ENDIF
C
      IF(N1.EQ.10)THEN
      GO TO 5
      ENDIF
C
      IF(N1.EQ.11)THEN
      GO TO 5
      ENDIF
C
      IF(N1.EQ.20)THEN
      GO TO 5
      ENDIF
C
      GO TO 5
  100 CONTINUE
      CALL TXTCLR(2,2)
      CALL QCMOV(5,1)
      WRITE(*,*) ' DRECEP terminated;'
      CLOSE (1)
      CLOSE (2)
      STOP
      END
C
C
C +++++++++++++ SUBROUTINE HYDRAUL +++++++++++++++++++++++++++++++++++++
C
      SUBROUTINE HYDRAUL(DUMMY,HPB,ECD)
C   THIS SUBROUTINE COMPUTES EQUIVALENT CIRCULATING DENSITY AND
C   BIT HORSEPOWER FROM MUD PROPERTIES AND WELL DIMENSIONS
      REAL IR
      DIMENSION D1(10),D2(10),DI(10),SL(10)
      OPEN(2,FILE='DRLDAT2',STATUS='OLD',ACCESS='DIRECT',RECL=20)
      READ(2,REC=1)XX
      NS=INT(XX)
      DO 10 I=1,NS
      I1=2+(I-1)*4
      READ(2,REC=I1)DI(I)
      I2=I1+1
      READ(2,REC=I2)D1(I)
      I2=I2+1
      READ(2,REC=I2)D2(I)
      I2=I2+1
      READ(2,REC=I2)SL(I)
   10 CONTINUE
      READ(2,REC=42)Q
      READ(2,REC=43)DS
      READ(2,REC=44)DB
      READ(2,REC=45)ROPE
      READ(2,REC=46)PP
      READ(2,REC=47)CP
      READ(2,REC=48)IR
      IF(IR.EQ.1.00)THEN
      READ(2,REC=49)PV
      READ(2,REC=50)YP
      T3=YP+PV
      T6=PV+T3
```

```
      RN=3.32*ALOG10(T6/T3)
      RK=510.*T3/511.**RN
      ELSE
      READ(2,REC=51)RK
      READ(2,REC=52)RN
      ENDIF
      READ(2,REC=53)RHOS
      READ(2,REC=54)RHOF
      BHP=CP
      TOTL=0.
      DPDP=0.
      XX=0.
      DO 20 I=1,NS
      VA=Q/2.448/(D2(I)**2-D1(I)**2)
      VAP=Q/2.448/DI(I)**2
      CALL SLIPV(RK,RN,D1(I),D2(I),DS,RHOS,RHOF,VA,VS)
      RT=1.-VS/VA
      RHOA=RHOF*(1.-SF)+RHOF*SF
      IF(IR.EQ.1.00)THEN
      CALL GRADF(RHOA,PV,YP,IR,D1(I),D2(I),VA,GF)
      CALL GRADF(RHOF,PV,YP,IR,XX,DI(I),VAP,GFI)
      ELSE
      CALL GRADF(RHOA,RK,RN,IR,D1(I),D2(I),VA,GF)
      CALL GRADF(RHOF,RK,RN,IR,XX,DI(I),VAP,GFI)
      ENDIF
      BHP=BHP+(.052*RHOA+GF)*SL(I)
      DPDP=DPDP+(.052*RHOF-GFI)*SL(I)
      TOTL=TOTL+SL(I)
   20 CONTINUE
      ECD=BHP/(.052*TOTL)
      DPB=PP+DPDP-BHP
      IF(DPB.GE.0.)THEN
      HPB=DPB*Q/1714.
      WRITE(2,REC=55)ECD
      WRITE(2,REC=56)HPB
      ENDIF
      CLOSE(2)
      RETURN
      END
C
C
C
C
C ++++++++++++ SUBROUTINE SLIPV ++++++++++++++++++++++++++++++++++++++
C
      SUBROUTINE SLIPV(RK,RN,D1,D2,DS,RHOS,RHOF,VA,VS)
C  SUBROUTINE FOR CALCULATION OF SLIP VELOCITY OF CUTTINGS
C  PRESTON-MOORE CORRELATION ASSUMED
C
      AVIS=(RK/144.)*((D2-D1)/VA)**(1.-RN)*((2.+1./RN)
     &/0.0208)**RN
      VSL=82.87*DS**2*(RHOS-RHOF)/AVIS
      VS=VSL
      VSI=2.9*DS*(RHOS-RHOF)**.667/RHOF**.333/AVIS**.333
      IF(VSI.LT.VS)VS=VSI
      VST=1.54*(DS*(RHOS-RHOF)/RHOF)**.5
      IF(VST.LT.VS)VS=VST
      RETURN
      END
C
C
C
C ++++++++++++ SUBROUTINE GRADF ++++++++++++++++++++++++++++++++++++++
C
```

```
      SUBROUTINE GRADF(W,X1,X2,IR,D1,D2,VE,GF)
C   SUBROUTINE FOR CALCULATION OF FRICTIONBAL P DROP IN
C   SECTION OF PIPE OR ANNULUS
      REAL IR
      IF(D1.GT.0.)THEN
      DE=.816*(D2-D1)
      ELSE
      DE=D2
      ENDIF
      IF(IR.EQ.2)THEN
      IF(D1.GT.0.)THEN
      UE=X1/144.*((D2-D1)/VE)**(1.-X2)*((2.+1./X2)/.0208)**X2
      ELSE
      UE=X1/96.*(D2/VE)**(1.-X2)*((3.+1./X2)/.0416)**X2
      ENDIF
      ELSE
      UE=X1
      X1=1.
      ENDIF
      R=928.*W*VE*DE/UE
      CALL FFPOW(X1,R,F,I)
      GF=F*W*VE**2./25.8/DE
      IF(D1.GT.0.)THEN
      GF2=UE*VE/1000./(D2-D1)**2
      IF(IR.EQ.1.00)GF2=GF2+X2/200./(D2-D1)
      ELSE
      GF2=UE*VE/1500./D2**2
      IF(IR.EQ.1.00)GF2=GF2+X2/225./D2
      ENDIF
      IF(GF2.GT.GF)GF=GF2
      RETURN
      END
C
C
C +++++++++++++ SUBROUTINE FFPOW ++++++++++++++++++++++++++++++++++++
C
C
      SUBROUTINE FFPOW(XN,RN,F,I)
C   SUBROUTINE FOR CALCULATION OF FRICTION FACTORS
      IF(RN.LT.1000.) GO TO 30
      FO=.01
      I=0
   10 X=4./XN**.75*ALOG10(RN*FO**(1.-XN/2.))-.395/XN**1.2
      F=1/X/X
      I=I+1
      IF(I.GT.200)GO TO 20
      IF((ABS(F-FO)/FO).LT.1.0E-4)RETURN
      FO=F
      GO TO 10
   20 WRITE(*,*) 'Error*** FFPOW did not converge'
   30 F=16./RN
      RETURN
      END
C
C
C
C +++++++++++++ SUBROUTINE DPRET ++++++++++++++++++++++++++++++++++++
C
C
      SUBROUTINE DPRET(ISCRN)
C   Subroutine for Interpretation of Data Gathered while
C   Drilling
C   Interpretation by Transition Point Analysis
```

```
C    Output - Parameters a1,a2,a3, and a6 for use in EBCM
C            and ODC models
C
      COMMON /VAR/XN2,XN1,WD2,WD1,ECD2,ECD1,HPB2,HPB1
     *,ROP2,ROP1,D,DO,DI,NBIT,TBOT
      COMMON /PAR/A1,A7,A5,A6,A1,A2,A4,AP,PCHAN(8)
      COMMON /FLAG/IFLAG4(5),IFLAG5(4),N
      DIMENSION IFLAG1(4),IFLAG2(4),IFLAG3(4)
      OPEN(2,FILE='DRLDAT2',STATUS='OLD',ACCESS='DIRECT',RECL=20)
      DAVG=D+100.
      READ(2,REC=109)A6
      READ(2,REC=110)A1
      READ(2,REC=111)A2
      READ(2,REC=113)A3
      READ(2,REC=106)WBT
      READ(2,REC=44)DB
      WDT=WBT/DB
      DO 10 I=1,4
      IFLAG1(I)=0
   10 CONTINUE
      IF(ECD1.EQ.0.00)THEN
      ECD1=ECD2
      HPB1=HPB2
      WD1=WD2
      XN1=XN2
      RETURN
      ENDIF
C
C % change in variables over trans. point
      PCHAN(1)=200.*ABS((XN1-XN2)/(XN1+XN2))
      PCHAN(2)=200.*ABS((WD1-WD2)/(WD1+WD2))
      PCHAN(3)=200.*ABS((ECD1-ECD2)/(ECD1+ECD2))
      PCHAN(4)=200.*ABS((HPB1-HPB2)/(HPB1+HPB2))
      PCHAN(7)=200.*ABS((DO-D)/(DO+D))
      PCHAN(8)=200.*ABS((ROP1-ROP2)/(ROP1+ROP2))
C
      IF(PCHAN(1).GT.10.)  IFLAG1(1)=1
      IF(PCHAN(2).GT.10.)  IFLAG1(2)=1
      IF(PCHAN(3).GT.10.)  IFLAG1(3)=1
      IF(PCHAN(4).GT.10.)  IFLAG1(4)=1
C
      DO 20 I=1,4
      I1=499+I
      I2=503+I
      I3=507+I
      READ(2,REC=I1)XX
      IFLAG2(I)=INT(XX)
      READ(2,REC=I2)XX
      IFLAG4(I)=INT(XX)
      READ(2,REC=I3)XX
      IFLAG5(I)=INT(XX)
   20 CONTINUE
C
      DO 30 I=1,4
      IF(IFLAG1(I).EQ.1)THEN
      IF(IFLAG2(I).EQ.1)IFLAG3(I)=1
      ENDIF
   30 CONTINUE
C
      N=0
      IFLAG4(0)=100000
      MINF4=100000
```

```
C
      DO 90 I=1,4
      IF(IFLAG1(I).EQ.1)THEN
      DO 80 J=1,4
      IF(J.EQ.I)GO TO 70
      IF(IFLAG1(J).EQ.1.AND.IFLAG3(J).NE.1)GO TO 85
C alternative    IF((PCHAN(J)-PCHAN(N))*2./(PCHAN(J)+PCHAN(N))
C criterion      $.GT..5.AND.IFLAG3(I).EQ.1)N=J
C
C Comp. parameter that has been calc'd the least
      IF(IFLAG4(I).LT.MINF4)THEN
      N=I
      MINF4=IFLAG4(I)
      ENDIF
  70  CONTINUE
  80  CONTINUE
      ENDIF
  85  CONTINUE
  90  CONTINUE
C
      DO 95 I=1,4
      IFLAG5(I)=IFLAG5(I)+IFLAG1(I)
      XX=REAL(IFLAG5(I))
      I1=507+I
      WRITE(2,REC=I1)XX
  95  CONTINUE
C
      IF(N.EQ.0)GO TO 200
C
      IF(N.EQ.1)THEN
      A2=LOG(ROP1/ROP2)/LOG(XN1/XN2)
C Normalization
      IF(IFLAG2(2).EQ.1)A2=A2+LOG(((WD2-WDT)/(4.-WDT))/
     *((WD1-WDT)/(4.-WDT))**A1)/LOG(XN1/XN2)
      IF(IFLAG2(3).EQ.1)A2=A2+2.303*A6*DAVG*(ECD2-ECD1)/LOG
     *(XN1/XN2)
      IF(IFLAG2(4).EQ.1)A2=A2+LOG((HPB2/HPB1)**A3)/LOG(XN1/XN2)
      IFLAG2(1)=1
      READ(2,REC=111)AP
      A2=(IFLAG4(1)*AP+A2)/(IFLAG4(1)+1)
      IFLAG4(1)=IFLAG4(1)+1
      WRITE(2,REC=111)A2
      XX=REAL(IFLAG2(1))
      WRITE(2,REC=500)XX
      XX=REAL(IFLAG4(1))
      WRITE(2,REC=504)XX
      ENDIF
C
      IF(N.EQ.2)THEN
      A1=LOG(ROP1/ROP2)/LOG(((WD1-WDT)/(4.-WDT))/
     *((WD2-WDT)/(4.-WDT)))
C Normalization
      IF(IFLAG2(1).EQ.1)A1=A1+LOG((XN2/XN1)**A2)/LOG(((WD1-WDT)
     */(4.-WDT))/((WD2-WDT)/(4.-WDT)))
      IF(IFLAG2(3).EQ.1)A1=A1+2.303*A6*DAVG*(ECD2-ECD1)
     */LOG(((WD1-WDT)/(4.-WDT))/((WD2-WDT)/(4.-WDT)))
      IF(IFLAG2(4).EQ.1)A1=A1+LOG((HPB2/HPB1)**A3)
     */LOG(((WD1-WDT)/(4.-WDT))/((WD2-WDT)/(4.-WDT)))
      IFLAG2(2)=1
      READ(2,REC=110)AP
      A1=(IFLAG4(2)*AP+A1)/(IFLAG4(2)+1)
      IFLAG4(2)=IFLAG4(2)+1
      WRITE(2,REC=110)A1
```

```
      XX=REAL(IFLAG2(2))
      WRITE(2,REC=501)XX
      XX=REAL(IFLAG4(2))
      WRITE(2,REC=505)XX
      ENDIF
C
      IF(N.EQ.3)THEN
      A6=LOG(ROP1/ROP2)/(2.303*DAVG*(ECD1-ECD2))
C Normalization
      IF(IFLAG2(1).EQ.1)A6=A6+LOG((XN2/XN1)**A2)/
     *(2.303*DAVG*(ECD1-ECD2))
      IF(IFLAG2(2).EQ.1)A6=A6+LOG(((WD2-WDT)/(4.-WDT))/
     *((WD1-WDT)/(4.-WDT)))**A1)/(2.303*DAVG*(ECD1-ECD2))
      IF(IFLAG2(4).EQ.1)A6=A6+LOG((HPB2/HPB1)**A3)/
     *(2.303*DAVG*(ECD1-ECD2))
      IFLAG2(3)=1
      READ(2,REC=109)AP
      A6=(IFLAG4(3)*AP+A6)/(IFLAG4(3)+1)
      IFLAG4(3)=IFLAG4(3)+1
      WRITE(2,REC=109)A6
      XX=REAL(IFLAG2(3))
      WRITE(2,REC=502)XX
      XX=REAL(IFLAG4(3))
      WRITE(2,REC=506)XX
      ENDIF
C
      IF(N.EQ.4)THEN
      A3=LOG(ROP1/ROP2)/LOG(HPB1/HPB2)
C Normalization
      IF(IFLAG2(1).EQ.1)A3=A3+LOG((XN2/XN1)**A2)/
     *LOG(HPB1/HPB2)
      IF(IFLAG2(2).EQ.1)A3=A3+LOG(((WD2-WDT)/(4.-WDT))/
     *((WD1-WDT)/(4.-WDT)))**A1)/LOG(HPB1/HPB2)
      IF(IFLAG2(3).EQ.1)A3=A3+2.303*A6*DAVG*(ECD2-ECD1)
     */LOG(HPB1/HPB2)
      IFLAG2(4)=1
      READ(2,REC=113)AP
      A3=(IFLAG4(4)*AP+A3)/(IFLAG4(4)+1)
      IFLAG4(4)=IFLAG4(4)+1
      WRITE(2,REC=113)A3
      XX=REAL(IFLAG2(4))
      WRITE(2,REC=503)XX
      XX=REAL(IFLAG4(4))
      WRITE(2,REC=507)XX
      ENDIF
C
  200 CONTINUE
C Write results to the screen
      IF(ISCRN.EQ.1)THEN
      CALL SCRNCTRL(ISCRN)
      ENDIF
      CLOSE(2)
      RETURN
      END
C
C
C +++++++++++++ SUBROUTINE DPRET2 ++++++++++++++++++++++++++++++++
C
      SUBROUTINE DPRET2(ISCRN)
C    Subroutine for Interpretation of Data Gathered while
C    Drilling
C    Interpretation by Regression Analysis
```

```
C     Output - Parameters a4,a5, and a7 for use in EBCM
C               and ODC models
C
      COMMON /REGRES/RDIN,IREG,NREG,RREG(30),DREG(30),WREG(30),GREG(30)
      COMMON /VAR/XN2,XN1,WD2,WD1,ECD2,ECD1,HPB2,HPB1
     *,ROP2,ROP1,D,DO,DI,NBIT,TBOT
      COMMON /PAR/A1,A7,A5,A6,A1,A2,A4,AP,FCHAN(8)
      OPEN(2,FILE='DRLDAT2',STATUS='OLD',ACCESS='DIRECT',RECL=20)
      IF((D-RDIN).LT.50.)THEN
      RREG(IREG)=(RREG(IREG)*NREG+ROP2)/(NREG+1)
      DREG(IREG)=(DREG(IREG)*NREG+D)/(NREG+1)
      WREG(IREG)=(WREG(IREG)*NREG+W)/(NREG+1)
      GREG(IREG)=(GREG(IREG)*NREG+GP)/(NREG+1)
      NREG=NREG+1
      ELSE
      RDIN=D
      NREG=1
      IF(IREG.GE.4)THEN
      CALL REGRE(IREG,RREG,DREG,WREG,GREG,A4,A5,A7)
      IREG=IREG+1
      ENDIF
      ENDIF
      RETURN
      END
C
C ++++++++++++ SUBROUTINE REGRE +++++++++++++++++++++++++++++++++
C
      SUBROUTINE REGRE(IREG,RREG,DREG,WREG,GREG,A4,A5,A7)
      DIMENSION RREG(30),DREG(30),WREG(30),GREG(30),AA(4,5)
C
      SW=0.
      SX=0.
      SY=0.
      SZ=0.
      SW2=0.
      SX2=0.
      SY2=0.
      SWX=0.
      SWY=0.
      SXY=0.
      SZW=0.
      SZX=0.
      SZY=0.
C
      DO 10 I=1,IREG
      SW=SW-WREG(I)
      SX=SX+GREG(I)
      SY=SY+(10000-DREG(I))
      SZ=SZ+RREG(I)
      SW2=SW2+WREG(I)**2.
      SX2=SX2+GREG(I)**2.
      SY2=SY2+(10000-DREG(I))**2
      SWX=SWX-WREG(I)*GREG(I)
      SWY=SWY-WREG(I)*(10000.-DREG(I))
      SXY=SXY+GREG(I)*(10000.-DREG(I))
      SZW=SZW-RREG(I)*WREG(I)
      SZX=SZX+RREG(I)*GREG(I)
      SZY=SZY+RREG(I)*(10000.-DREG(I))
   10 CONTINUE
C
      AA(1,1)=IREG
      AA(2,1)=SW
      AA(3,1)=SX
      AA(4,1)=SY
```

```
              AA(1,2)=SW
              AA(2,2)=SW2
              AA(3,2)=SWX
              AA(4,2)=SWY
              AA(1,3)=SX
              AA(2,3)=SWX
              AA(3,3)=SX2
              AA(4,3)=SXY
              AA(1,4)=SY
              AA(2,4)=SWY
              AA(3,4)=SXY
              AA(4,4)=SY2
              AA(1,5)=SZ
              AA(2,5)=SZW
              AA(3,5)=SZX
              AA(4,5)=SZY
C
C     GAUSS-JORDAN ELIMINATION
              CALL GAUJOR(AA,A,B,C,D)
              A4=B
              A5=C
              A7=D
              RETURN
              END
C
C  +++++++++++++ SUBROUTINE GAUJOR ++++++++++++++++++++++++++++++++
C
C     SUBROUTINE FOR GAUSS-JORDAN ELIMINATION WITH PARTIAL PIVOTING
C
              SUBROUTINE GAUJOR(AA,A1,A2,A3,A4)
              DIMENSION AA(4,5),RTIO
              N=4
              CF=0.
              N1=N
              N2=N+1
              DO 100 K=1,N1
C         PIVOTING
              NR=N
              IX=1
              NC=N2-1
              IF(K.NE.NC)THEN
              DO 30 IS=K,NR
              JS=K
              BG=ABS(AA(IS,K))
              DO 20 JJ=JD,NC
              AX=ABS(AA(IS,JJ))
              IF(AX.GT.BG)BS=AX
 20           CONTINUE
              IF(BG.LT.0.00001) THEN
              WRITE(*,*)"      *** Gauss-Jordan elim. ERROR ***"
              WRITE(*,*)"*** Row with ZERO elements encountered ***"
              ENDIF
              RTIO(IS)=AA(IS,K)/BG
 30           CONTINUE
              IS=K
              IR=IS
              PV=ABS(RTIO(IS))
              JD=IS-1
              DO 40 JS=JD,NR
              BT=ABS(RTIO(JS))
              IF(BT.GT.PV)THEN
              IR=JS
              PV=BT
              ENDIF
```

```
 40   CONTINUE
      IF(IR.NE.K)THEN
      IK=IR
      DO 50 JM=K,N2
      DM=AA(K,JM)
      AA(K,JM)=AA(IK,JM)
      AA(IK,JM)=DM
 50   CONTINUE
      ENDIF
      ENDIF
      S=AA(K,K)
      DO 60 J=K,N2
      AA(K,J)=AA(K,J)/S
 60   CONTINUE
      DO 80 I=1,N1
      IF(I.NE.K)THEN
      J=K
      S=AA(I,K)
 70   CONTINUE
      AA(I,J)=AA(I,J)-S*AA(K,J)
      J=J+1
      IF(J.LE.N2)GO TO 70
      ENDIF
 80   CONTINUE
100   CONTINUE
      A1=A(1,N2)
      A2=A(2,N2)
      A3=A(3,N2)
      A4=A(4,N2)
      RETURN
      END
C
      SUBROUTINE VARSTO(NVAR,ROP2,D,HPB2,ECD2,WREG(NVAR),
     *GREG(NVAR),XN,WB)
      OPEN(3,FILE='DRLVAR',STATUS='OLD',ACCESS='DIRECT',RECL=20)
      NV=(NVAR-1)*8+1
      WRITE(2,REC=NV)ROP2
      WRITE(2,REC=NV+1)D
      WRITE(2,REC=NV+2)HPB2
      WRITE(2,REC=NV+3)ECD2
      WRITE(2,REC=NV+4)WREG(NVAR)
      WRITE(2,REC=NV+5)GREG(NVAR)
      WRITE(2,REC=NV+6)XN
      WRITE(2,REC=NV+7)WB
      NVAR=NVAR+1
      CLOSE(3)
      RETURN
      END
C
      SUBROUTINE PRESTA(NVAR,PRE)
      DIMENSION ROP(200),WD(200),XN(200),HPB(200),W(200),GP(200)
     *,ECD(200),D(200)
      COMMON /PAR/A1,A7,A5,A6,A1,A2,A4,AP,PCHAN(8)
      IF(NVAR.LT.30)RETURN
      OPEN(3,FILE='DRLVAR',STATUS='OLD',ACCESS='DIRECT',RECL=20)
      M=20
      N=NVAR
      DO 10 I=1,N
      NV=(I-1)*8+1
      READ(2,REC=NV)ROP(I)
      READ(2,REC=NV+1)D(I)
      READ(2,REC=NV+2)HPB(I)
      READ(2,REC=NV+3)ECD(I)
```

```
      READ(2,REC=NV+4)W(I)
      READ(2,REC=NV+5)GP(I)
      READ(2,REC=NV+6)XN(I)
      READ(2,REC=NV+7)WB(I)
      XK=XK+ROP(I)/(((WD(I)-WDT)/(4.-WDT))**A1*XN(I)**A2*HPB(I)**A3
     $*EXP(-A4*W(I)+A5*GP(I)+A6*(GP(I)-ECD(I))+A7*(10000-D(I))))
   10 CONTINUE
      XK=XK/N
      DO 20 I=M,N
      RSIM=XK*((WD(I)-WDT)/(4.-WDT))**A1*XN(I)**A2*HPB(I)**A3
     $*EXP(-A4*W(I)+A5*GP(I)+A6*(GP(I)-ECD(I))+A7*(10000-D(I)))
      SUM=SUM+(ROP(I)-RSIM)**2.
   20 CONTINUE
      PRE=SQR(SUM)/(N-M+1)
      CLOSE(3)
      RETURN
      END
C
C ++++++++++++ SUBROUTINE SCRNINIT +++++++++++++++++++++++++++
C
      SUBROUTINE SCRNINIT(ISCRN)
C SUBROUTINE CALLING SCREEN NO. ISCRN
      DIMENSION IX(4),IY(4),A(80)
      CHARACTER A
      CHARACTER*6 FNAME
      CALL QSCLR
      CALL QPCLR
C
      IF(ISCRN.EQ.0)THEN
      FNAME='SCRNF0'
      ENDIF
      IF(ISCRN.EQ.1)THEN
      FNAME='SCRNF1'
      ENDIF
      IF(ISCRN.EQ.2)THEN
      FNAME='SCRNF2'
      ENDIF
      IF(ISCRN.EQ.3)THEN
      FNAME='SCRNF3'
      ENDIF
C
      OPEN(1,FILE=FNAME,STATUS='OLD')
C
      READ(1,40)NPNT
      IF(NPNT.GT.0)THEN
      DO 10 J=1,NPNT
      READ(1,30)(IX(I),I=1,4)
      READ(1,30)(IY(I),I=1,4)
      READ(1,40)KOLOR
      CALL PAINT(IX,IY,KOLOR)
   10 CONTINUE
      ENDIF
C
      READ(1,40)NLIN
      IF(NLIN.GT.0)THEN
      DO 15 J=1,NLIN
      READ(1,60)IX1,IY1,IX2,IY2,KOLOR
      CALL QLINE(IX1,IY1,IX2,IY2,KOLOR)
   15 CONTINUE
      ENDIF
C
      READ(1,40)NTXT
      IF(NTXT.GT.0)THEN
```

```
      CALL QCMOV(0,24)
      A(1)=' '
      DO 5 J=1,25
      READ(1,20)(A(I),I=2,77),KOLOR
      CALL QTYPE(32,KOLOR)
      WRITE(*,21)(A(I),I=1,77)
    5 CONTINUE
      ENDIF
C
      CLOSE(1)
      CALL QTYPE(32,6)
      CALL QCMOV(0,24)
      WRITE(*,*)'Bit Run No.     - '
      WRITE(*,*)'Initial Depth   - '
      WRITE(*,*)'Current Depth   - '
      WRITE(*,*)'Time on Bottom  - '
   20 FORMAT(76A1,I2)
   21 FORMAT(77A1)
   30 FORMAT(4I3)
   40 FORMAT(I2)
   50 FORMAT(3I2)
   60 FORMAT(4I3,I2)
      RETURN
      END
C
C +++++++++++++ SUBROUTINE SCRNCTRL  +++++++++++++++++++++++++++++
C
      SUBROUTINE SCRNCTRL(ISCRN)
C  SUBROUTINE FOR CONTROL OF DIFFERENT SCREENS
      COMMON /VAR/XN2,XN1,WD2,WD1,ECD2,ECD1,HPB2,HPB1
     *,ROP2,ROP1,D,DO,DI,NBIT,TBOT
      COMMON /FAR/A7,A5,A6,A1,A2,A4,A3,AP,PCHAN(8)
      COMMON /FLAG/IFLAG4(4),IFLAG5(4),N
C
      CHARACTER*4 BBB
      BBB='N.C.'
      IF(ISCRN.EQ.1)THEN
      CALL QTYPE(32,7)
      CALL QCMOV(0,24)
      WRITE(*,50)NBIT
      CALL QTYPE(32,6)
      CALL QCMOV(0,24)
      WRITE(*,*)'Bit Run No.     - '
      CALL QTYPE(32,7)
      CALL QCMOV(0,23)
      WRITE(*,51)DI
      CALL QTYPE(32,6)
      CALL QCMOV(0,23)
      WRITE(*,*)'Initial Depth   - '
      CALL QTYPE(32,7)
      CALL QCMOV(0,22)
      WRITE(*,51)D
      CALL QTYPE(32,6)
      CALL QCMOV(0,22)
      WRITE(*,*)'Current Depth   - '
      CALL QTYPE(32,7)
      CALL QCMOV(0,21)
      WRITE(*,52)TBOT
      CALL QTYPE(32,6)
      CALL QCMOV(0,21)
      WRITE(*,*)'Time on Bottom  - '
C
      CALL QTYPE(32,7)
      CALL QCMOV(0,13)
```

```
            WRITE(*,40)BBB,BBB,BBB,BBB
            CALL QTYPE(32,4)
            WRITE(*,60)'a2'
            CALL QTYPE(32,7)
            CALL QCMOV(0,13)
            KOLOR=7
            A2P=A2
            IF(N.EQ.3)THEN
            KOLOR=2
            A2P=AP
            ENDIF
            CALL QTYPE(32,KOLOR)
            CALL QCMOV(0,9)
            WRITE(*,43)A2P,A2,IFLAG4(1),IFLAG5(1)
            CALL QTYPE(32,4)
            CALL QCMOV(0,9)
            WRITE(*,60)'a6'
            CALL QTYPE(32,KOLOR)
            CALL QCMOV(0,9)
            WRITE(*,41)XN1,XN2,PCHAN(1)
            CALL QTYPE(32,4)
            CALL QCMOV(0,9)
            WRITE(*,61)' N'
C
            CALL QTYPE(32,7)
            CALL QCMOV(0,8)
            WRITE(*,40)BBB,BBB,BBB,BBB
            CALL QTYPE(32,4)
            CALL QCMOV(0,8)
            WRITE(*,60)'a7'
            CALL QTYPE(32,7)
            CALL QCMOV(0,8)
            WRITE(*,42)WO,W,BBB
            CALL QTYPE(32,4)
            CALL QCMOV(0,8)
            WRITE(*,61)' W'
C
            KOLOR=7
            A3P=A3
            IF(N.EQ.4)THEN
            KOLOR=2
            A3P=AP
            ENDIF
            CALL QTYPE(32,KOLOR)
            CALL QCMOV(0,7)
            WRITE(*,43)A3P,A3,IFLAG4(4),IFLAG5(4)
            CALL QTYPE(32,4)
            CALL QCMOV(0,7)
            WRITE(*,60)'a8'
            CALL QTYPE(32,KOLOR)
            CALL QCMOV(0,7)
            WRITE(*,41)HPB1,HPB2,PCHAN(4)
            CALL QTYPE(32,4)
            CALL QCMOV(0,7)
            WRITE(*,61)'HPB'
C
            CALL QTYPE(32,7)
            CALL QCMOV(0,6)
            WRITE(*,41)ROP1,ROP2,PCHAN(8)
            CALL QCMOV(0,6)
            WRITE(*,61)'ROP'
C
   41 FORMAT(7X,F7.1,3X,F7.1,4X,F5.1)
```

```
   42 FORMAT(7X,F7.1,3X,F7.1,5X,A4)
   43 FORMAT(44X,E9.3,1X,E9.3,4X,I4,3X,I4)
   40 FORMAT(47X,A4,6X,A4,6X,A4,3X,A4)
   50 FORMAT(19X,I4)
   51 FORMAT(19X,F7.1,' ft')
   52 FORMAT(19X,F7.2,' hrs')
   60 FORMAT(39X,A2)
   61 FORMAT(1X,A3)
C
      ENDIF
      RETURN
      END
C
C ++++++++++ UTILITY SUBROUTINES ++++++++++++++++++++++++++++++++++++
C
      SUBROUTINE PAINT(IX,IY,KOLOR)
      DIMENSION IX(4),IY(4)
      DO 10 I=IY(1),IY(4)
      CALL QLINE(IX(1),I,IX(2),I,4)
   10 CONTINUE
      RETURN
      END
C
      SUBROUTINE TXTCLR(NROWS,ISTART)
      IFIN=ISTART+NROWS-1
      DO 10 I=ISTART,IFIN
      WRITE(*,*)
     *'
   10 CONTINUE
      RETURN
      END
```

*******************************************************************

COMSTRUC.LST

Configuration and Format of Datafile COM

Datafile COM presents 6 types of information which are stored
in one or two disk tracks of memory. At the beginning of every
disk track there is a specified flag which permits the recog-
nition of the information stored in that track. Below is a list
of flags and the information they are associated with, which is
followed by a list containing nomenclature and fortran format
information.

| Flag | Information | Contents of Track |
|------|-------------|-------------------|
| 1 | Drilling parameters | DATE/TIME/D/DBT/WB/XN/PS1/PS2/PS3 |
| 2 | Drilling Parameters | DELD/WH/TBOT/TOFB/CP/FP/GAS |
| 3 | Bit Parameters | DIN/IBRUN/XJ1/XJ2/XJ3/TW/BW/GW/MT |
| 4 | Pump Parameters | PEFF/PUD(1)/PUL1(1)/PUD(2)/PUL1(2) PUD(3)/PUL1(3)/PTYP |
| 5 | Well Parameters | REGION/RIG/WELL |
| 6 | Mud Parameters | DEPMM/RHOF/PV/IFVIS/IYP/APIWB/PH/ IGIN/ICHLO/ICA/WLAPTP/VAP/PM/PF/X |
| 7 | Mud Parameters | SAND/SOLID/OIL/MTYP |

--- NOMENCLATURE ---

| Symbol | Description | Form |
|---|---|---|
| DATE | Date | 3A3 |
| TIME | Time | 3A3 |
| D | Vertical Depth (ft) | F6.0 |
| DBT | Bit Location (ft) | F6.0 |
| WB | Weight on Bit (klb) | F7.2 |
| XN | Rotary Speed (rpm) | F7.2 |
| PS1 | Strokes Pump # 1 | F6.0 |
| PS2 | Strokes Pump # 2 | F6.0 |
| PS3 | Strokes Pump # 3 | F6.0 |
| DELD | Depth Drilled (ft) | F6.2 |
| WH | Hook Load (klb) | F6.2 |
| TBOT | Rotating Time (hrs) | F6.2 |
| TOFB | Non-Rotating Time (hrs) | F6.2 |
| CP | Casing Pressure (psi) | F6.0 |
| PP | Pump Pressure (psi) | F6.0 |
| GAS | Gas % | F2.1 |
| DIN | Bit Insertion Depth (ft) | I4 |
| IBRUN | Bit Run # | F6. |
| DIAM | Bit Diameter (in.) | 2A4 |
| BTYP | Bit type | F4.1 |
| XJ1 | Jet Nozzle Size (in.) | F4.1 |
| XJ2 | Jet Nozzle Size (in.) | F4.1 |
| XJ3 | Jet Nozzle Size (in.) | F4.0 |
| TW | Tooth Wear | F4.0 |
| BW | Bearing Wear | F4.0 |
| GW | Gauge Wear | I2 |
| MTYP | Mud Type | F7.0 |
| PEFF | Pump Effeciency | F6.3 |
| PUD(1) | Liner Diameter Pump # 1 (in.) | F7.3 |
| PUL(1) | Liner Length Pump # 1 (in.) | F6.3 |
| PUD(2) | Liner Diameter Pump # 2 (in.) | F7.3 |
| PUL(2) | Liner Length Pump # 2 (in.) | F6.3 |
| PUD(3) | Liner Diameter Pump # 3 (in.) | F7.3 |
| PUL(3) | Liner Length Pump # 3 (in.) | F3.0 |
| PTYP | Pump Type | 2A3 |
| REGION | Well Region | 2A3 |
| RIG | Rig ID | 3A4 |
| WELL | Well ID | F6.0 |
| DEPMM | Depth @ Mud Measurement (ft) | F5.2 |
| RHOF | Mud Density (at pump) (ppg) | F5.1 |
| PV | Plastic Viscosity (cp) | I3 |
| IFVIS | Funnel Viscosity (cp) | I3 |
| IYP | Yield Point (lb/100ft) | F5.1 |
| APIWB | Water Loss API | F4.1 |
| PH | Mud pH | I3 |
| IGIN | Gel Initial | I3 |
| IGFIN | Gel Final | I6 |
| ICHLO | Chlorites % | I5 |
| ICA | Calcium+ % | F5.1 |
| WLHPTP | Water Loss HPTP | F5.1 |
| VAP | Apparent Viscosity (cp) | F4.1 |
| PM |  | F4.1 |
| PF |  | F4.1 |
| XMF |  | F4.1 |
| SAND | Mud Sand Contents % | F4.1 |
| SOLID | Total Solids % | F4.1 |
| OIL | Oil % | I2 |
| MTYP | Mud Type | I2 |

FILE WRLDATE Data Organization

| Record No. | Variable Name | Units | Description |
|---|---|---|---|
| 1 | NS | | # of sections in well |
| 2 - 41 | DI | in. | pipe ID |
| 2 - 41 | D1 | in. | annulus ID |
| 2 - 41 | D2 | in. | annulus OD |
| 2 - 41 | SL | ft | section length |
| 42 | Q | gpm | mud flowrate (at pumps) |
| 43 | DS | in. | cutting diam. |
| 44 | DB | in. | bit diam. |
| 45 | ROPE | ft/hr | estim. pen. rate |
| 46 | PP | psia | pump pressure |
| 47 | CP | psia | casing pressure |
| 48 | IR | --- | rheological model flag |
| 49 | PV | cp | plastic viscosity |
| 50 | YP | lb/100ft | yield point |
| 51 | RK | | consistency index |
| 52 | RN | | flow behavior index |
| 53 | RHOS | ppg | cuttings density |
| 54 | RHOF | ppg | mud density |
| 55 | ECD | ppg | equivalent circ. density |
| 56 | HPB | HP | bit horsepower |
| 57 | DBT | ft | bit location |
| 58 | DT | ft | total depth of well |
| 59 | NP | --- | pipe condition flag |
| 60 | XN | rpm | rotary speed |
| 61 | WB | klb | weight on bit |
| 62 | TOB | hrs | time on bottom |
| 63 | TOFB | hrs | time off bottom |
| 64 | DIN | ft | depth bit inserted |
| 65 | IBRUN | --- | bit run No. |
| 66 - 68 | XJi | in/16 | jet nozzle size |
| 69 | TW | --- | tooth wear |
| 70 | BW | --- | bearing wear |
| 71 | GW | --- | gauge wear |
| 72 | MTYP | --- | mud type |
| 73 | PEFF | --- | pump efficiency |
| 74 - 79 | PUDi | in. | pump diameter |
| 74 - 79 | PULi | in. | pump length |
| 80 | PTYP | --- | pump type |
| 81 | REGION | --- | well location |
| 82 | RIG | --- | well location |
| 83 | WELL | --- | well location |
| 84 | DEPMM | ft | dep. @ mud measurement |
| 85 | IFVIS | cp | fan viscosity |
| 86 | APIWB | | API water loss |
| 87 | PH | --- | mud pH |
| 88 | IGIN | | gel strength into well |
| 89 | IGFIN | | final gel strength |
| 90 | ICHLO | | chlorides in mud |
| 91 | ICAT | | calcium in mud |
| 92 | WLAPTP | | APTP water loss |
| 93 | VAP | | AP viscosity |
| 94 | PM | | |
| 95 | PF | | |
| 96 | XMF | | |
| 97 | SAND | | |
| 98 | SOLID | | |

FILE .RLDAT2 Data Organization
(continued)

| Record No. | Variable Name | Units | Description |
|---|---|---|---|
| 99 | OIL | | |
| 100 - 102 | Ni | | bit model numbers |
| 103 | DAVG | ft | avg dep. present bit |
| 104 | GP | ppg | pore pressure gradient |
| 105 | FSMAX | -- | limit of model function |
| 106 | WBT | klb | treshhold bit wt. |
| 107 - 113 | Ai | -- | model parameters |
| 114 | CB | $ | bit cost |
| 115 | CR | $/day | rig cost |
| 116 | TT | hrs | trip time |
| 117 | TCM | min | connection time |
| 118 | SL | ft | stand length |
| 119 | OTB | hrs | offset bit life |
| 120 | OXW | klb | offset bit WOB |
| 121 | OXN | rpm | offset bit rot. speed |
| 122 | ODB | in. | offset bit diam. |
| 123 | OHF | -- | offset bit tooth wear |
| 124 | OBF | -- | offset bit bearing wear |
| 125 - 127 | ONi | | offset bit model numbers |
| 128 | ODAVG | ft | avg. dep. offset bit |
| 129 | OECD | ppg | avg. eq. cir. den. offs. bit |
| 130 | OGP | ppg | avg. pore pres. grad offs bit |
| 131 | OHPB | HP | offset bit horsepower |
| 132 | OWBT | klb | offs. bit treshhold bit wt. |
| 133 | OFSMX | | offs. bit lim. of model fnc. |
| 134 - 140 | Ai | -- | offs. bit model parameters |

We claim:

1. A real-time method for controlling a drilling process to optimize drilling costs on a real-time basis for a drilling operation in progress using a drill bit in a borehole comprising the steps of:

(a) acquiring values of a plurality of real-time drilling operation variables and an actual penetration rate for the drill bit from sensors;

(b) storing the plurality of acquired values of real-time drilling operating variables and the actual penetration rate for the drill bit in the borehole;

(c) calculating at predetermined intervals, a plurality of values of real-time parameters of a real-time, multivariate, predictive, penetration rate model, having real-time operating variables associated with the drilling process, each parameter associated with one of the real-time drilling operating variables of the model wherein the parameters measure the sensitivity of the penetration rate of the drill bit in the borehole to each of the operating variables of the model;

(d) calculating at predetermined intervals, real-time expressions of the penetration rate of the drill bit in the borehole using the real-time operating variables in the model and the calculated values of the real-time parameters;

(e) calculating a total, expected controllable cost over a future drilling interval of depth using a predictive penetration rate expression and calculating an expected penetration rate over the future drilling interval of depth;

(f) recalculating real-time expressions for the penetration rate using altered values of operating variables and parameters;

(g) recalculating total, expected controllable costs over the future drilling interval of depth using the recalculated real-time expressions for the penetration rate of the drill bit in the borehole; and (h) controlling the drilling process by identifying the minimum total expected controllable cost over the future drilling interval of depth and setting the values of the real-time drilling operating variables equal to the values of the real-time drilling operating variables in the real-time expression for the penetration rate used to calculate the minimum total expected controllable cost.

2. The method of claim 1 and further including the step of:

displaying the expected costs calculated in step (g) to an operator.

3. The method of claim 1 and further including the step of:

comparing previously calculated values of the penetration rates of the drill bit at a selected depths to the actual penetration rates acquired from the sensors at the same selected depths to calculate a value that quantifies the predictive ability of the penetration rate model.

4. The method of claim 3 wherein the step of quantifying includes:

calculating the square root of the sum of the differences between the actual penetration rates and the expected penetration rates over a future drilling interval of depth; and dividing the square root term by the difference between a total number of acquired penetration rates and a minimum number of rates required to establish the predicted penetration rate.

5. The method of claim 3 and further including the step of:

quantifying a contribution of each variable in a penetration rate model to the predictive ability of the model.

6. The method of claim 5 wherein the step of quantifying includes:

sequentially incorporating variables in the penetration rate model;

calculating a predictive statistic based on a specified interval; and calculating the difference between a predictive statistic calculated following the addition of a given variable to the penetration rate model and a predictive statistic obtained prior to the inclusion of the variable in the penetration rate model, said difference term representing the contribution of the variable to the predictive ability of the penetration rate model.

7. The method of claim 5 and further including the steps of:

ranking variables on the basis of their contributions to the predictive ability of a penetration rate model; and calculating a predictive statistic for each version of a predictive penetration rate model based on the sequential inclusion of each prospective variable.

8. The method of claim 7 and further including the step of:

identifying the predictive penetration rate model among different predictive penetration rate models having the best predictive ability.

9. The method of claim 8 wherein the identification includes the steps of:

comparing the predictive statistic of each penetration rate model as computed with the same real-time drilling operating variables; and selecting the model having the best predictive statistic based on the specified interval.

10. The method of claim 1 wherein one or more of the parameters in step (c) are calculated using transition point analysis by identifying successive data points where operating variables change and generate changes in the penetration rate of the bit.

11. The method of claim 10 and further including the step of:

quantifying the sensitivity of the penetration rate to the operating variables by performing transition point analysis and regression analysis.

12. The method of claim 1 wherein one or more of the parameters in step (c) are calculated using regression analysis techniques.

13. The method of claim 1 and further including:

repeating step (c) through step h in an iterative fashion by incrementing or decrementing values of selected real-time drilling operating variables, selected real-time parameters and model coefficients.

14. The method of claim 1 wherein step (a) includes acquiring values of weight of the drill bit, drill bit type and size, drill bit rotary speed, drill bit hydraulics, fractional bit wear, formation pore pressure, drilling fluid, circulating density, the total interval drilled by the bit, and selected seismic data.

15. The method of claim 1 wherein step (c) further includes:

calculating real-time parameter values associated with real-time operating variables when more than one of the operating variables change at successive intervals coinciding with a penetration rate change.

16. The method of claim 15 wherein the step of calculating the parameter values includes:

normalizing the real-time expression of the penetration rate based upon one of the plurality of real-time drilling operating variables prior to calculating a parameter for the desired variable.

17. The method of claim 1 wherein step (c) further includes:

calculating the sensitivity of the penetration rate of a drill bit to lithology changes.

18. The method of claim 17 and further including the step of:

smoothing the effects of lithology fluctuations on the penetration rate of a drill bit by computing average values of parameters.

19. The method of claim 17 and further including the step of:

smoothing the effects of lithology fluctuations on the penetration rate of a drill bit by computing average values of operating variables.

20. The method of claim 1 and further including the step of:

calculating the abrasiveness of a subsurface formation by dividing the time required to drill the formation by selected real-time operating variables and drill bit constants.

21. The method of claim 1 wherein step (d) includes:

estimating future values of the penetration rate of a drill bit by extrapolating a real-time penetration rate over a future drilling interval of depth.

22. The method of claim 1 wherein step (e) further includes the step of calculating the total interval of depth the current bit in the borehole can drill before reaching a specified degree of wear.

23. The method of claim 22 and further including the step of:

calculating a real-time, predictive penetration rate expression based on a bit wear variable whose value represents selected degrees of wear.

24. The method of claim 22 and further including the step of:

computing the future drilling interval of depth to a specified degree of drill bit wear for the drill bit currently in the borehole.

25. The method of claim 1 wherein step (e) further includes the step of calculating the total time the current drill bit in the borehole can drill before reaching a specified degree of water, and calculating the remaining time of the total time calculated to the specified degree of bit wear.

26. The method of claim 1 and further including the step of:

identifying abnormally pressured subsurface formations in the absence of direct pore pressure measurements.

27. The method of claim 1 wherein step (e) further includes the step of:

estimating a bit depreciation function as a drill bit is used in a drilling operation.

28. The method of claim 1 wherein step (e) further includes the step of:

estimating the expected, controllable unit drilling cost over the future drilling interval of depth by allocating said controllable costs in a manner best approximating the change in value of the controllable costs.

* * * * *

UNITED STATES PATENT AND TRADEMARK OFFICE
CERTIFICATE OF CORRECTION

PATENT NO. : 4,845,628

DATED : July 4, 1989

INVENTOR(S) : Richard L. Gray et al.

It is certified that error appears in the above-identified patent and that said Letters Patent is hereby corrected as shown below:

Column 3, line 30, delete "ech" and substitute --each--.

Column 76, line 56, delete "water" and substitute --wear--.

Signed and Sealed this

Fourteenth Day of January, 1992

Attest:

HARRY F. MANBECK, JR.

*Attesting Officer*   *Commissioner of Patents and Trademarks*